US012651257B2

(12) United States Patent
Singleton et al.

(10) Patent No.: US 12,651,257 B2
(45) Date of Patent: Jun. 9, 2026

(54) SYSTEMS, METHODS, APPARATUSES AND COMPUTER PROGRAM PRODUCTS FOR PERFORMING OPERATIONS ON RECEIVED REQUEST DATA OBJECTS

(71) Applicant: Assurant, Inc., New York, NY (US)

(72) Inventors: John Singleton, Atlanta, GA (US); Anthony Johnson, Conyers, GA (US)

(73) Assignee: Assurant, Inc., New York, NY (US)

( * ) Notice: Subject to any disclaimer, the term of this patent is extended or adjusted under 35 U.S.C. 154(b) by 278 days.

(21) Appl. No.: 18/122,400

(22) Filed: Mar. 16, 2023

(65) Prior Publication Data

US 2024/0311817 A1     Sep. 19, 2024

(51) Int. Cl.
G06Q 20/38        (2012.01)
G06Q 20/40        (2012.01)

(52) U.S. Cl.
CPC ......... G06Q 20/389 (2013.01); G06Q 20/401 (2013.01)

(58) Field of Classification Search
None
See application file for complete search history.

(56) References Cited

U.S. PATENT DOCUMENTS

| | | | | |
|---|---|---|---|---|
| 7,139,731 B1 * | 11/2006 | Alvin | ................ | G06Q 30/0603 705/76 |
| 7,752,096 B2 * | 7/2010 | Santalo | ................ | G06Q 40/02 705/40 |
| 7,870,009 B2 * | 1/2011 | Patterson | ............... | G06Q 10/10 705/2 |
| 7,904,353 B2 * | 3/2011 | Christensen | ........... | G06Q 40/00 705/30 |
| 8,364,498 B2 * | 1/2013 | Sohr | ..................... | G06Q 10/10 705/40 |

(Continued)

FOREIGN PATENT DOCUMENTS

| | | |
|---|---|---|
| JP | 2009-116484 A | 5/2009 |
| JP | 2021-077417 A | 5/2021 |

(Continued)

OTHER PUBLICATIONS

Dirk A. Zetzsche et al. "DLT-Based Enhancement of Cross-Border Payment Efficiency—a Legal and Regulatory Perspective." (May 2022). Retrieved online Dec. 15, 2024. https://www.bis.org/publ/work1015.pdf (Year: 2022).*

(Continued)

*Primary Examiner* — James A Reagan
(74) *Attorney, Agent, or Firm* — Alston & Bird LLP

(57)        ABSTRACT

Various embodiments are directed to apparatuses, methods, and computer program products for providing centralized remittance and corresponding data communication amongst various third party systems. Request data objects are transmitted from requesting devices to a centralized remittance system, and the centralized remittance system requests data objects from remittance entity device. Standardized data objects are generated, and a multi-transaction data file transmitted toward a multi-transaction server to cause remittance instructions to be transmitted to respective client devices, reducing consumption of processing, memory, and network resources, and improving efficiency throughout the system.

19 Claims, 14 Drawing Sheets

(56) References Cited

U.S. PATENT DOCUMENTS

| | | | | |
|---|---|---|---|---|
| 8,694,429 | B1 * | 4/2014 | Ballaro | G06Q 30/0635 |
| | | | | 705/40 |
| 8,959,595 | B2 * | 2/2015 | Wang | H04L 63/04 |
| | | | | 726/4 |
| 10,062,108 | B2 * | 8/2018 | Mulhim | G06Q 20/10 |
| 10,068,295 | B1 * | 9/2018 | Allen | G06Q 40/08 |
| 10,296,627 | B2 * | 5/2019 | Bowman | G06F 16/2471 |
| 10,504,082 | B2 * | 12/2019 | Kulpati | G06Q 20/16 |
| 10,586,019 | B1 * | 3/2020 | Dowling | G06Q 20/145 |
| 10,776,206 | B1 * | 9/2020 | Vaghani | G06F 11/1471 |
| 10,970,669 | B2 * | 4/2021 | Yund | G06Q 10/0838 |
| 11,163,496 | B1 * | 11/2021 | Armangau | G06F 3/0653 |
| 11,281,660 | B1 * | 3/2022 | Pike | G06F 16/27 |
| 11,354,303 | B2 * | 6/2022 | Gu | G06F 16/2379 |
| 12,073,410 | B2 * | 8/2024 | Paulson | G06Q 20/405 |
| 12,086,130 | B1 * | 9/2024 | Brown | G06F 16/2365 |
| 2001/0056362 | A1 * | 12/2001 | Hanagan | G06F 16/289 |
| | | | | 705/40 |
| 2003/0125969 | A1 * | 7/2003 | Kizer | G06Q 20/04 |
| | | | | 705/64 |
| 2004/0243477 | A1 * | 12/2004 | Mathai | G06Q 30/0633 |
| | | | | 705/26.8 |
| 2006/0041487 | A1 * | 2/2006 | Santalo | G06Q 10/10 |
| | | | | 705/30 |
| 2006/0259324 | A1 * | 11/2006 | Patterson | G16H 10/20 |
| | | | | 705/2 |
| 2007/0050219 | A1 * | 3/2007 | Sohr | G06Q 40/08 |
| | | | | 705/4 |
| 2007/0162308 | A1 * | 7/2007 | Peters | G06Q 10/06 |
| | | | | 705/2 |
| 2008/0262950 | A1 * | 10/2008 | Christensen | G06Q 20/10 |
| | | | | 705/40 |
| 2008/0294551 | A1 * | 11/2008 | Degenhart | G06Q 40/02 |
| | | | | 705/39 |
| 2009/0204530 | A1 * | 8/2009 | Hanson | G06Q 20/14 |
| | | | | 713/176 |
| 2009/0319425 | A1 * | 12/2009 | Tumminaro | G06Q 20/425 |
| | | | | 705/42 |
| 2010/0169163 | A1 * | 7/2010 | Alvin | G06Q 30/0603 |
| | | | | 705/26.1 |
| 2010/0241507 | A1 * | 9/2010 | Quinn | G06Q 30/0256 |
| | | | | 705/14.42 |
| 2011/0258115 | A1 * | 10/2011 | Mulhim | G06Q 40/02 |
| | | | | 705/42 |
| 2012/0303519 | A1 * | 11/2012 | Burke | G06Q 30/02 |
| | | | | 705/39 |
| 2014/0282900 | A1 * | 9/2014 | Wang | H04L 63/04 |
| | | | | 726/4 |
| 2014/0289188 | A1 * | 9/2014 | Shimanovsky | G06F 16/23 |
| | | | | 707/609 |
| 2014/0365348 | A1 * | 12/2014 | Ballaro | G06Q 30/0633 |
| | | | | 705/30 |
| 2017/0053357 | A1 * | 2/2017 | Bowman | G06F 16/2471 |
| 2019/0385120 | A1 * | 12/2019 | Yund | G06Q 10/0838 |
| 2020/0082357 | A1 * | 3/2020 | Crane | G06Q 40/02 |
| 2020/0111082 | A1 * | 4/2020 | Wu | G06Q 20/3674 |
| 2020/0134586 | A1 * | 4/2020 | Wu | G06Q 20/407 |
| 2020/0202316 | A1 * | 6/2020 | Hu | G06Q 20/108 |
| 2021/0034034 | A1 * | 2/2021 | Cook | G06Q 10/20 |
| 2021/0150498 | A1 * | 5/2021 | Fukuizumi | H04M 15/70 |
| 2021/0279698 | A1 * | 9/2021 | Godshall | G06Q 20/3821 |
| 2022/0027870 | A1 * | 1/2022 | Crane | G06F 9/541 |
| 2022/0058181 | A1 * | 2/2022 | Gu | G06F 16/2379 |
| 2022/0253845 | A1 * | 8/2022 | Werner | G06Q 40/08 |
| 2023/0030421 | A1 * | 2/2023 | Werner | G06F 16/2272 |
| 2023/0042992 | A1 * | 2/2023 | Loveland | G06Q 20/405 |
| 2023/0259948 | A1 * | 8/2023 | Paulson | G06N 20/00 |
| | | | | 705/44 |

FOREIGN PATENT DOCUMENTS

| | | | | |
|---|---|---|---|---|
| KR | 10-2011-0136301 A | 12/2011 | | |
| KR | 10-2021-0100075 A | 8/2021 | | |
| WO | WO-9928830 A1 * | 6/1999 | | G06Q 20/18 |
| WO | WO-2006057061 A1 * | 6/2006 | | G06F 9/466 |
| WO | WO-2010081057 A2 * | 7/2010 | | G06Q 10/1053 |

OTHER PUBLICATIONS

McKinsey & Company. "A vision for the future of cross-border payments." (Oct. 24, 2018). Retrieved online Dec. 15, 2024. (Year: 2018) https://www.mckinsey.com/~/media/McKinsey/Industries/Financial%20Services/Our%20Insights/A%20vision%20for%20the%20future%20of%20cross%20border%20payments%20final/A-vision-for-the-future-of-cross-border-payments-web-final.ashx (Year: 2018).*
Federal Reserve Board. "Distributed ledger technology in payments, clearing, and settlement." (2016). Retrieved online Dec. 15, 2024. https://www.federalreserve.gov/econresdata/feds/2016/files/2016095pap.pdf (Year: 2016).*
ISA/220—Notification of Transmittal or Search Report and Written Opinion of the ISA, or the Declaration Mailed on Jul. 8, 2024 for WO Application No. PCT/US24/019518, 11 page(s).

* cited by examiner

| | | |
|---|---|---|
| Client 666 | 11111 | $200 |
| Client 777 | 22222 | $250 |
| | 33333 | $250 |
| Client 888 | 44444 | $500 |
| | 55555 | $250 |

410
412
414

350 Transmit request details
201

352 Receive request details
241

| | | |
|---|---|---|
| Bank 1 | 11111 | $200 |
| Bank 2 | 22222 | $250 |
| | 33333 | $250 |
| Bank 3 | 44444 | $500 |
| | 55555 | $250 |

400
402
404

430

| Multi-transaction data file | | |
|---|---|---|
| Client 666 | 11111 | $200 |
| Client 777 | 22222 | $250 |
| Client 777 | 33333 | $250 |
| Client 888 | 44444 | $500 |
| Client 888 | 55555 | $250 |

440

| Client 666 | Payee COO111 | $200 |
|---|---|---|
| Client 777 | Payee COO111 | $500 |
| Client 888 | Payee COO111 | $750 |

450

| Client 666 | Supplier ID 0001 | $200 |
|---|---|---|
| Client 777 | Supplier ID 0001 | $500 |
| Client 888 | Supplier ID 0001 | $750 |

460

| Client 666 | $200 |
|---|---|
| Client 777 | $500 |
| Client 888 | $750 |

Third party verification and modification interface

| Search Parameter 1 | Search Parameter 2 | ... | SEARCH |

502

| Unique Identifier | Quantity | Created date | Transaction Date | Status |
|---|---|---|---|---|
| Identifier 1 | 200 | mm/dd/yyyy | mm/dd/yyyy | Rejected |
| Identifier 2 | 250 | mm/dd/yyyy | mm/dd/yyyy | Pending/Scheduled |
| Identifier 3 | 250 | mm/dd/yyyy | mm/dd/yyyy | Pending/Scheduled |
| Identifier 4 | 500 | mm/dd/yyyy | mm/dd/yyyy | Pending/Scheduled |
| Identifier 5 | 250 | mm/dd/yyyy | mm/dd/yyyy | Pending/Scheduled |

Edit payment details

| Identifier | Quantity | Created date | Transaction Date | Status |
|---|---|---|---|---|
| Identifier 4 | 500 | mm/dd/yyyy | mm/dd/yyyy | Pending/Scheduled |

510

APPROVE

512

REJECT

514

Enter reject reason or description

516

SAVE CHANGES

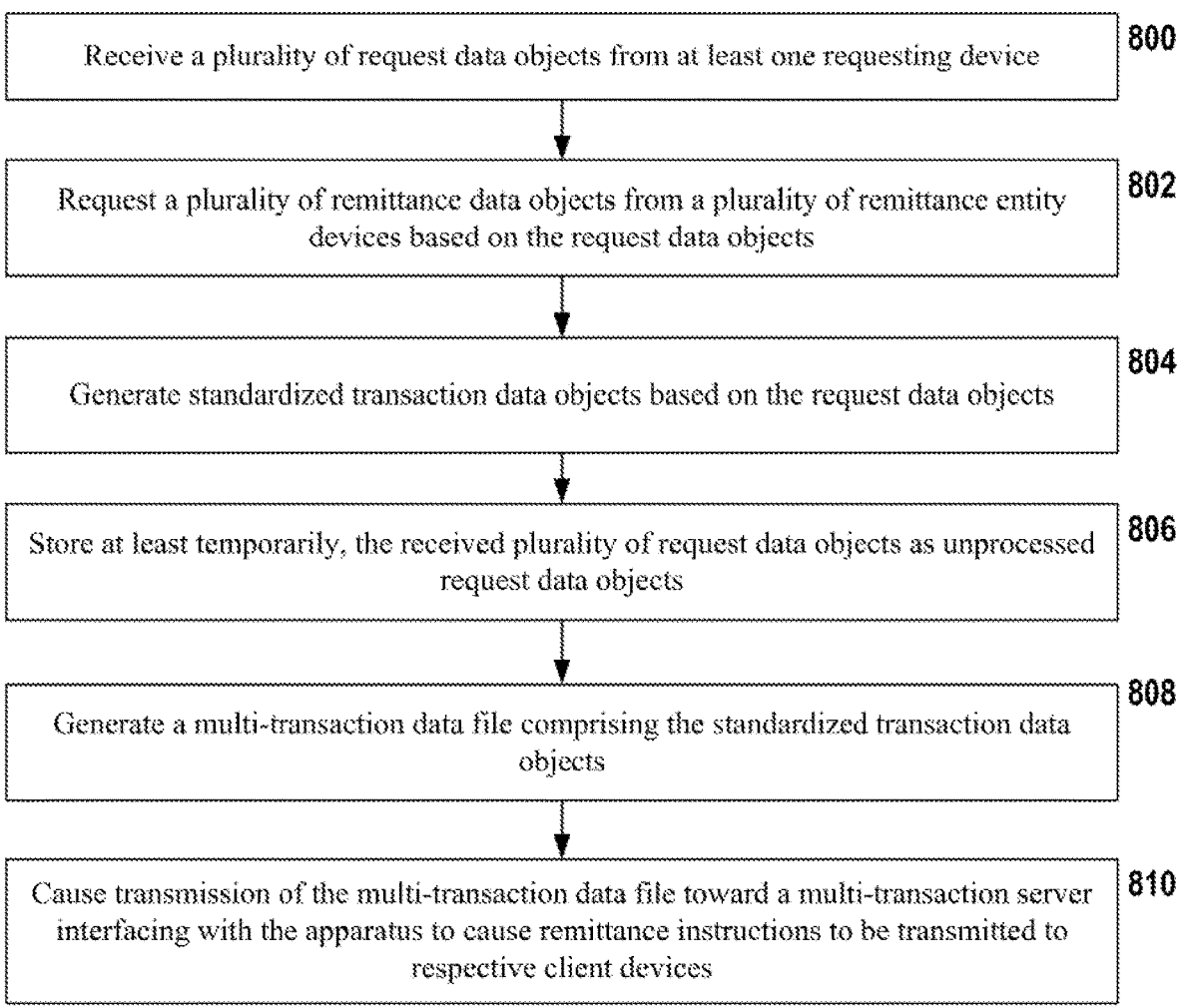

Receive a plurality of request data objects from at least one requesting device | 800

Request a plurality of remittance data objects from a plurality of remittance entity devices based on the request data objects | 802

Generate standardized transaction data objects based on the request data objects | 804

Store at least temporarily, the received plurality of request data objects as unprocessed request data objects | 806

Generate a multi-transaction data file comprising the standardized transaction data objects | 808

Cause transmission of the multi-transaction data file toward a multi-transaction server interfacing with the apparatus to cause remittance instructions to be transmitted to respective client devices | 810

Fig. 8

SYSTEMS, METHODS, APPARATUSES AND COMPUTER PROGRAM PRODUCTS FOR PERFORMING OPERATIONS ON RECEIVED REQUEST DATA OBJECTS

FIELD OF THE INVENTION

The present disclosure relates, generally, to systems, methods, and apparatuses for executing operations on received request data objects, and more specifically, to the operation of a centralized computing system in communication with a plurality of third party systems to receive and process data objects and generate standardized transaction data objects and multi-transaction data files.

BACKGROUND

Various computing systems, such as those associated with a centralized system, are configured to act as an intermediary party to facilitate the transfer of data between various third party systems. Applicant has identified a number of deficiencies and problems associated with such systems. Through applied effort, ingenuity, and innovation many deficiencies of such platforms have been solved by developing solutions that are in accordance with the embodiments as discussed herein, many examples of which are described in detail herein.

BRIEF SUMMARY

In general, embodiments of the present disclosure provided herein perform operations on received request data objects and generate standardized transaction data objects and multi-transaction data files.

An apparatus is provided, comprising at least one processor and at least one non-transitory memory including computer program code, the at least one memory and the computer program code configured to, with the processor, cause the apparatus to at least receive a plurality of request data objects from at least one requesting device. The at least one memory and the computer program code are configured to, with the processor, request a plurality of remittance data objects from a plurality of remittance entity devices based on the request data objects.

The at least one memory and the computer program code are configured to generate standardized transaction data objects based on the request data objects, and generate a multi-transaction data file comprising the standardized transaction data objects. The at least one memory and the computer program code are configured to cause transmission of the multi-transaction data file toward a multi-transaction server interfacing with the apparatus to cause remittance instructions to be transmitted to respective client devices. In certain embodiments, causing transmission of the multi-transaction data file toward a multi-transaction server interfacing with the apparatus further causes remittance of funds to a recipient account associated with respective requesting devices of the at least one requesting devices.

The at least one memory and the computer program code may be further configured to, with the processor, cause the apparatus to at least receive response data from the multi-transaction server, the response data comprising one or more rejected responses. The at least one memory and the computer program code may be further configured to, with the processor, cause the apparatus to queue the one or more rejected responses from the multi-transaction server into a resolution queue. In certain embodiments, the at least one memory and the computer program code are further configured to, with the processor, cause the apparatus to transmit computer program instructions configured to facilitate at least one of initiation of reimbursement of a rejected transaction toward a respective remittance entity device or a resubmission toward the multi-transaction server.

The at least one memory and the computer program code are further configured to, with the processor, cause the apparatus to at least receive response data from the multi-transaction server, the response data generated from user input provided via the respective requesting device, and based on the response data, transmit computer program instructions configured to facilitate at least one of initiation of reimbursement toward a respective remittance entity device or a resubmission toward the multi-transaction server.

In certain embodiments, the response data comprises a plurality of response data objects associated with respective request data objects, the client input indicates at least one rejection associated with at least one respective request data object.

The at least one memory and the computer program code are further configured to, with the processor, cause the apparatus to at least store at least temporarily, the received plurality of request data objects as unprocessed request data objects. The at least one memory and the computer program code are further configured to, with the processor, cause the apparatus to, at either a predefined time or based on a predefined time interval, generate the standardized transaction data objects from the unprocessed request data objects, generate the multi-transaction data file, and transition a status of a respective request data object from unprocessed to scheduled, wherein the multi-transaction data file is transmitted toward the multi-transaction server as a batch file. In certain embodiments, prior to transmission of remittance instructions being transmitted to respective client devices, the multi-transaction server stores the standardized transaction data objects at least temporarily and facilitates review via the respective requesting device.

A method is provided including receiving a plurality of request data objects from at least one requesting device, and requesting a plurality of remittance data objects from a plurality of remittance entity devices based on the request data objects. The method further includes generating standardized transaction data objects based on the request data objects, and generating a multi-transaction data file comprising the standardized transaction data objects. The method further includes causing transmission of the multi-transaction data file toward a multi-transaction server to cause remittance instructions to be transmitted to respective client devices.

The method may further include receiving response data from the multi-transaction server, the response data comprising one or more rejected responses, and queueing the one or more rejected responses from the multi-transaction server into a resolution queue. The method may further include transmitting computer program instructions configured to facilitate at least one of initiation of reimbursement of a rejected transaction toward a respective remittance entity device or a resubmission toward the multi-transaction server.

The method may further include receiving response data from the multi-transaction server, the response data generated from user input provided via the respective requesting device, and based on the response data, transmitting computer program instructions configured to facilitate at least one of initiation of reimbursement toward a respective remittance entity device or a resubmission toward the multi-transaction server. The response data comprises a plurality of response data objects associated with respective request data objects, the client input indicates at least one rejection associated with at least one respective request data object.

The method may further include storing at least temporarily, the received plurality of request data objects as unprocessed request data objects. The method may further include, at either a predefined time or based on a predefined time interval, generating the standardized transaction data objects from the unprocessed request data objects, generate the multi-transaction data file, and transition a status of a respective request data object from unprocessed to scheduled, wherein the multi-transaction data file is transmitted toward the multi-transaction server as a batch file.

A computer program product is provided, comprising at least one non-transitory computer-readable storage medium having computer-executable program code instructions stored therein, the computer-executable program code instructions comprising program code instructions to receive a plurality of request data objects from at least one requesting device. The computer-executable program code instructions comprising program code instructions to request a plurality of remittance data objects from a plurality of remittance entity devices based on the request data objects. The computer-executable program code instructions comprising program code instructions to generate standardized transaction data objects based on the request data objects, and generate a multi-transaction data file comprising the standardized transaction data objects. The computer-executable program code instructions include program code instructions to cause transmission of the multi-transaction data file toward a multi-transaction server interfacing with the computer program product to cause remittance instructions to be transmitted to respective client devices.

The computer-executable program code instructions comprising program code instructions to receive response data from the multi-transaction server, the response data comprising one or more rejected responses, and queue the one or more rejected responses from the multi-transaction server into a resolution queue. The computer-executable program code instructions comprising program code instructions to transmit computer program instructions configured to facilitate at least one of initiation of reimbursement of a rejected transaction toward a respective remittance entity device or a resubmission toward the multi-transaction server.

In certain embodiments, the computer-executable program code instructions comprising program code instructions to receive response data from the multi-transaction server, the response data generated from user input provided via the respective requesting device, and based on the response data, transmit computer program instructions configured to facilitate at least one of initiation of reimbursement toward a respective remittance entity device or a resubmission toward the multi-transaction server.

The computer-executable program code instructions comprising program code instructions to store at least temporarily, the received plurality of request data objects as unprocessed request data objects. The computer-executable program code instructions comprising program code instructions to at either a predefined time or based on a predefined time interval, generate the standardized transaction data objects from the unprocessed request data objects, generate the multi-transaction data file, and transition a status of a respective request data object from unprocessed to scheduled, wherein the multi-transaction data file is transmitted toward the multi-transaction server as a batch file.

An apparatus is provided with means for receiving a plurality of request data objects from at least one requesting device, and means for requesting a plurality of remittance data objects from a plurality of remittance entity devices based on the request data objects. The apparatus further includes means for generating standardized transaction data objects based on the request data objects, and generating a multi-transaction data file comprising the standardized transaction data objects. The apparatus further includes means for causing transmission of the multi-transaction data file toward a multi-transaction server interfacing with the apparatus to cause remittance instructions to be transmitted to respective client devices.

The apparatus may further include means for receiving response data from the multi-transaction server, the response data comprising one or more rejected responses, and queueing the one or more rejected responses from the multi-transaction server into a resolution queue. The apparats may further include means for transmitting computer program instructions configured to facilitate at least one of initiation of reimbursement of a rejected transaction toward a respective remittance entity device or a resubmission toward the multi-transaction server.

The apparatus may further include means for receiving response data from the multi-transaction server, the response data generated from user input provided via the respective requesting device, and based on the response data, transmitting computer program instructions configured to facilitate at least one of initiation of reimbursement toward a respective remittance entity device or a resubmission toward the multi-transaction server. The response data comprises a plurality of response data objects associated with respective request data objects, the client input indicates at least one rejection associated with at least one respective request data object.

The apparatus may further include means for storing at least temporarily, the received plurality of request data objects as unprocessed request data objects. The apparatus may further include means for, at either a predefined time or based on a predefined time interval, generating the standardized transaction data objects from the unprocessed request data objects, generate the multi-transaction data file, and transition a status of a respective request data object from unprocessed to scheduled, wherein the multi-transaction data file is transmitted toward the multi-transaction server as a batch file.

The above summary is provided merely for purposes of summarizing some example embodiments of the invention so as to provide a basic understanding of some aspects of the invention. Accordingly, it will be appreciated that the above described example embodiments are merely examples and should not be construed to narrow the scope or spirit of the disclosure in any way. It will be appreciated that the scope of the disclosure encompasses many potential embodiments, some of which will be further described below, in addition to those here summarized.

BRIEF DESCRIPTION OF THE DRAWINGS

Reference will now be made to the accompanying drawings, which are not necessarily drawn to scale, and wherein:

FIGS. 5A-5B are example user interface displays in accordance certain example embodiments of the present disclosure;

FIG. 8 is a flowchart depicting operations performed in accordance certain example embodiments of the present disclosure.

DETAILED DESCRIPTION

Figure 1A:
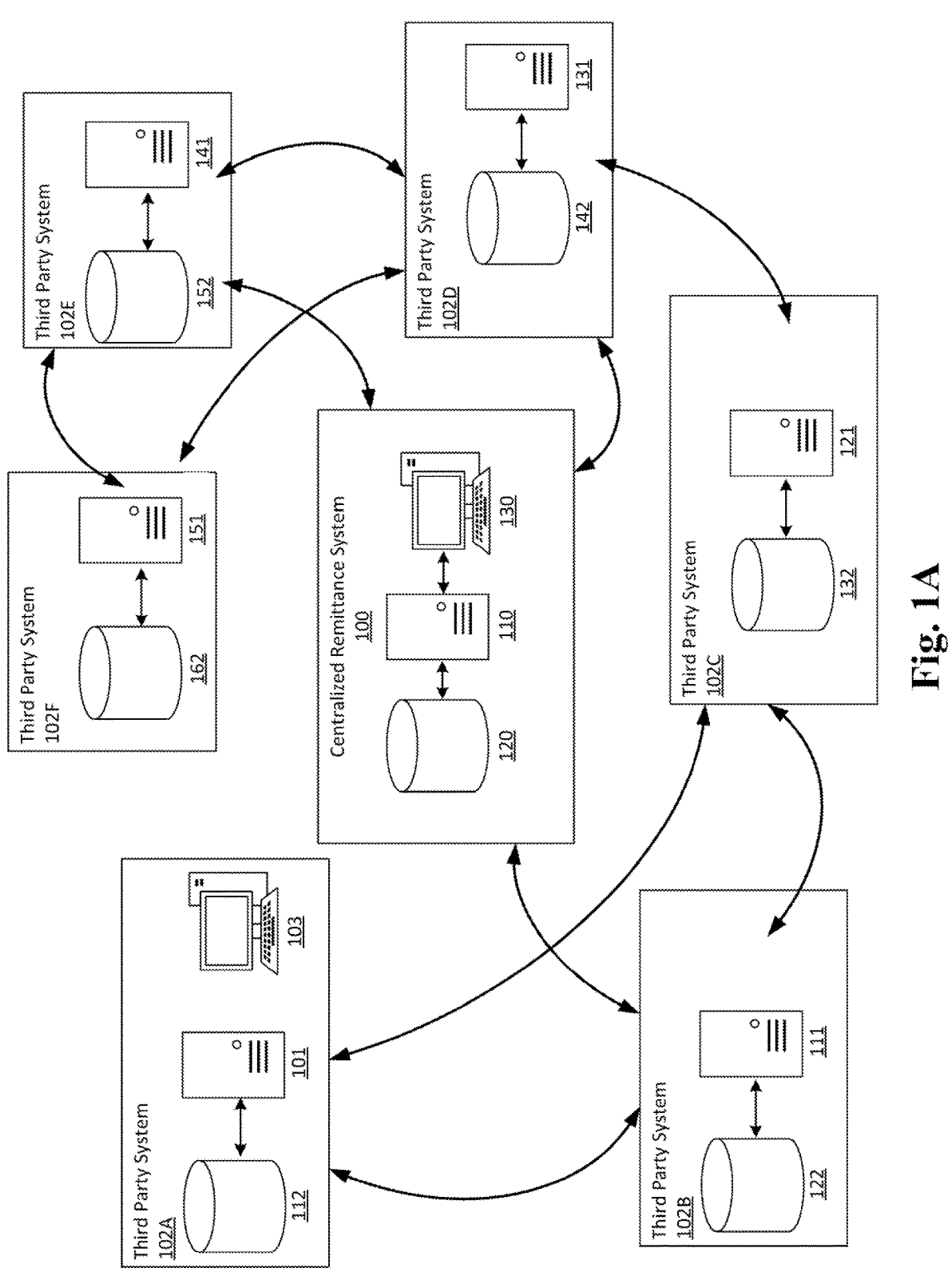
FIGS. 1A and 1B are schematic block diagrams of a system within which embodiments of the present disclosure may operate.

The present disclosure more fully describes various embodiments with reference to the accompanying drawings. It should be understood that some, but not all embodiments are shown and described herein. Indeed, the embodiments may take many different forms, and accordingly this disclosure should not be construed as limited to the embodiments set forth herein. Rather, these embodiments are provided so that this disclosure will satisfy applicable legal requirements. Like numbers refer to like elements throughout.

It should be understood at the outset that although illustrative implementations of one or more aspects are illustrated below, the disclosed assemblies, systems, and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents. While values for dimensions of various elements are disclosed, the drawings may not be to scale.

The words "example," or "exemplary," when used herein, are intended to mean "serving as an example, instance, or illustration." Any implementation described herein as an "example" or "exemplary embodiment" is not necessarily preferred or advantageous over other implementations.

Embodiments of the present disclosure now will be described more fully hereinafter with reference to the accompanying drawings, in which some, but not all embodiments of the disclosure are shown. Indeed, embodiments of the disclosure may be embodied in many different forms and should not be construed as limited to the embodiments set forth herein; rather, these embodiments are provided so that this disclosure will satisfy applicable legal requirements. Like numbers refer to like elements throughout.

Overview

Remote, secure transactions between three or more computing systems may be inefficient and cumbersome, particularly when many transmissions between the systems are being sent in a disorganized and spontaneous manner. In some instances of the present disclosure, a centralized system may be employed to coordinate the transmissions of two or more other computing systems to improve the efficiency of a group of interacting computing systems. Further, coordinated computing systems may still suffer from transmission congestion, unintentionally redundant transmissions, and/or substantial delay caused by sequentially carrying out transmissions and other actions among the various computing systems. Various embodiments of the present disclosure may relate to improved coordination for data transmissions using fewer transmissions and less bandwidth via one or more multi-transaction data files. Various embodiments of the present disclosure may relate to parallelized data-handling processes and systems to reduce net transmission time and to increase transaction speed and throughput, while also improving data accuracy via the verification, validation, and/or review processes and systems described herein. Moreover, various embodiments of the centralized system describe herein may be configured for use by a plurality of disparate other computing systems capable of causing one or more transmissions via the centralized system using various application program interfaces (APIs) as described herein.

An example of computing environments experiencing the processing, electronic communication, and efficiency concerns described herein is distributed payment systems involving a plurality of electronically interacting computing systems. In such examples, remote payors may transmit secure payments to remote requesters and/or recipients using various protocols as described herein. Example identities of various parties to such remote, secure transactions between three or more computing systems, along with example transaction types, are provided for context when explaining the structure and operation of various underlying computing systems and processes, and the scope of the present disclosure should be understood to not be limited to the example payment systems and other systems described herein. Rather, the present disclosure may relate to various improvements in transmission and processing devices, systems, and methods independent of the underlying purpose or context for such transmission and processing devices, systems, and methods.

For example, various third parties and respective third party systems are involved in transactions relating to mortgages and the payment of insurance premiums from escrow accounts held by lenders. Homeowners pay a lender a mortgage payment, and the lender in turn holds portions of the payments in escrow to be paid to various parties, such as insurance carriers, tax collecting entities, and/or the like. The banks or other financial institutions in receipt of the mortgage payments may therefore be configured as or associated with remittance entity devices and are responsible for timely distributing funds to the intended recipient parties. A centralized remittance system facilitates the distribution of the funds by receiving funds from numerous remittance entity devices, and routing of the funds toward insurance carriers. Additionally, a multi-transaction server assists in streamlining certain payments toward the correct entity. Adding additional complexity, each party involved in a transaction may operate its own system which can provide, receive, and/or modify data relating to a transaction, and may further be integrated with one or more banking systems which execute the payment or receipt of funds on their behalf.

In certain circumstances, entities such as insurance carriers or lending entities may lack robust information technology infrastructure for efficiently managing the information tied to the transactions and facilitating the routing of funds and related information from the lender to the insurance carrier. For example, transactions may be initiated by a lender for a policy that is no longer up to date or in place, such that arduous processes relating to check cancellation, returning of funds, and/or the like may need to be implemented. Some systems may facilitate payment by check remittance which can result in delays due to mailing and processing, and misdirected funds in instances such as when policies or loan terms change, a property is sold, and/or the like, while a check is in route. Additional symptoms of the lack of robust information technology may lead to late payment and an associated lapse in coverage. In instances of incorrect payment, insufficient funds, incorrect information accompanying a payment, and/or the like, processing and networking resources may be consumed to attempt to reverse or correct such transactions, resulting in the overexpenditure of related processing, memory, networking, and other computational resources. Even where information technology infrastructures allow efficient electronic payment, such as automated clearing house (ACH), factors such as market fragmentation, inconsistent protocols and account updating procedures may make large scale systems involving various lenders and various insurance carriers, as well as additional intermediaries and/or third party services that help facilitate the transactions, difficult to efficiently implement and operate.

The present disclosure relates generally to systems, methods, and apparatuses for executing centralized communication of remittance data using supported data structures associated with one or more third party servers, including but not limited to numerous carrier systems that request payment of insurance premiums, various remittance entity devices that remit payment on behalf of a lender, a multi-transaction server, and various client devices operated by financial institutions that receive and transmit payments on behalf of the respective third parties.

Centralized remittance systems as described herein according to example embodiments, are particularly preferred when compared to computing systems that rely on electronic systems that implement one-to-one and/or one-in-one out payments where an electronic or other payment is remitted for each invoice generated. Various centralized remittance systems described herein facilitate at least an initial processing of request data objects received and on an ongoing basis from numerous carrier systems, generate standardized transaction data accordingly, then strategically and temporarily hold the standardized transaction data objects for a period of time, enabling other third party systems to access the standardized transaction data objects, and potentially modify, reject, and/or approve associated payments.

Numerous users from various organizations can access the centralized remittance system provided according to example embodiments, to review standardized transaction data objects, modify certain data points, request cancellation of an associated transaction, cancel an associated transaction, and/or the like, without incurring cancellation and return of funds that were transmitted to an insurance carrier. Such centralized data remittance systems are particularly preferred when compared to computing systems defined by infrastructure deficiencies that perform reactive processing, one-in one-out processing and/or the like, which can cause many transactions to be initiated but later cancelled or modified after funds arrive at the carrier, and result in wasted processing, memory, and network resources. For example, when a carrier receives funds that were no longer due, or surplus amounts, the carrier is obligated to return funds to the borrower and/or lender. This creates significant increase overhead throughout the system as any form of refund, whether electronic or check, requires accompanying record-keeping.

In contrast, centralized remittance systems according to example embodiments provide improved efficiencies by temporarily holding standardized transaction data objects, allowing a review, verification and/or modification phase, then directing payment remittance to proceed as further described herein. This enables carriers to review payment details before the payment is remitted to the carrier, and enables cancellation, if appropriate, before the funds are remitted, providing reduced consumption of processing, memory, and network resources, and improving the efficiency of the overall system, related third party systems, and/or the like.

Additionally, the multi-transaction data file generated according to example embodiments reduces the number of transactions routed through the system, therefore reduces the consumption of processing, memory, and network resources, and further improves the overall efficiency of the system. Systems implemented without the advantages of the disclosed embodiments may suffer from high overhead caused by one-for-one transactions that must be routed, processed, and tracked, at every step and by every component throughout the overall system, including each third party system, financial system involved in the transaction, and/or the like.

Definitions

The term "centralized remittance system" is used to refer to a hardware and software platform for facilitating centralized remittance using supported data structures, and is hosted or operates under the direction of an entity that is independently of a lender and insurance carrier, but operates as a facilitator of payments therebetween. The centralized remittance system comprises an apparatus comprising at least one processor, and at least one non-transitory memory comprising instructions that, with the at least one processor, cause the apparatus to execute operations such as but not limited to receiving request data objects from requesting devices, requesting remittance data objects, generating standardized transaction data objects, generating multi-transaction data files, and other operations described herein. In some examples, the centralized remittance system may take the form of one or more centralized remittance servers disposed in communication with one or more additional servers running software applications and having access to one or more databases storing digital content items, application-related data, and/or the like. In certain embodiments, the centralized remittance system is defined by a collection of computing devices including a centralized remittance server, a centralized remittance repository, and one or more networked devices.

The term "centralized remittance server" refers to one or more computing devices associated with a centralized remittance system and configured to receive, store, and otherwise process data in order to execute remittance workflows by interacting with various networked devices and/or third party systems. In various embodiments, a centralized remittance server is configured to receive, generate, transmit, store, and/or otherwise process data including data structures, data elements, data packets, and/or the like to be communicated between the centralized remittance system and one or more third party systems. For example, a centralized remittance server is configured to execute various instructions, actions, and/or the like so as to enable the centralized remittance system to execute at least a portion of a remittance operation. In certain embodiments, the functionality of the centralized remittance server is provided via a single server, or, alternatively, via a collection of servers having a common functionality, or, in further alternative embodiments, the functionality of the centralized remittance servers is segmented among a plurality of servers or collections of servers performing subsets of the described functionality of the centralized remittance server.

"Data" refers to data capable of being transmitted, received, and/or stored in accordance with embodiments of the present disclosure. Thus, use of any such terms should not be taken to limit the spirit and scope of embodiments of the present invention. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like. Similarly, where a centralized remittance system, third party system, computing device associated therewith, and/or the like is described herein to send data to another centralized remittance system, third party system, computing device associated therewith, and/or the like, it will be appreciated that the data may be sent either directly to the other system, computing device, and/or the like or may be sent indirectly via one or more intermediary computing devices, such as, for example, one or more servers, resources, relays, routers, network access points, base stations, hosts, and/or the like. As a non-exhaustive list provided for illustrative purposes, provider data, policy data, lender data, system data, and/or the like embody data as described herein.

The term "repository" refers to a database or computing location associated with a system described herein where data is stored, accessed, modified and otherwise maintained by a respective system. A centralized remittance repository may be used by the centralized remittance system to store data, including data structures, in order to facilitate at least one operation of the centralized remittance system, such as, for example, a centralized remittance operation. The centralized remittance repository facilitates storage of various data, including data structures, in a format defined by a data storage protocol that is native to the centralized remittance system. In certain embodiments, a repository embodies a data storage device or devices, a separate database server or servers, or as a combination of data storage devices and separate database servers. Further, in some embodiments, the centralized remittance repository may be embodied as a distributed repository such that some of the stored data is stored centrally in a location within a respective system and other data stored in a single remote location or a plurality of remote locations. Alternatively, in some embodiments, a repository may be distributed over a plurality of remote storage locations such as in a cloud storage environment.

"User" refers to an individual, a group of individuals, a business, an organization, and/or the like that access a centralized remittance system using one or more networked devices. In certain embodiments, a user is associated with a system organization embodied by an organization that operates the centralized remittance system. Alternatively, in certain embodiments, a user is associated with a third party system operated by a third party entity, such that a device associated with a user identifier associated with the user defines at least a portion of the third party system. The relationship of the organization with which the user is associated to the respective system is defined by access credentials.

The term "third party system" refers to one or more computing devices embodied in hardware, software, firmware, and/or a combination thereof, operated by and/or otherwise controlled by a third party entity (e.g., a business or an organization) or an agent thereof for purposes of supporting one or more actions performed by the third party entity. For example, a third party system may include a software program, application, platform, or service that is configured to communicate with a centralized remittance system for purposes of servicing, managing, and/or performing one or more actions that define various functions and/or operations of a third party business organization that is accessible to a networked device and/or the centralized remittance system. For example, as described herein, a third party system is a system operated by a third party entity such as an insurance carrier (i.e. "an insurance provider" or "provider") or a lender entity (i.e. a "lender"). In some embodiments, the third party system is embodied by one or more computing devices configured to perform functionality associated with funds remittance. In certain circumstances, a third party system operates on a compiled code base or repository that is separate and distinct from that which supports the centralized remittance system. In certain embodiments, the third party system comprises additional storage repositories (e.g., databases) associated with tasks, functions, and/or actions that may be performed via the third party system, such as, for example, tasks, functions, and/or actions that may be performed in order to facilitate one or more functions or operations of the centralized remittance system. In some embodiments, the third party system communicates with the centralized remittance system, and vice versa, through one or more APIs. In some embodiments, the third party system is configured to receive one or more tokens or other authentication credentials that are used to facilitate secure communication of identifiable data between the third party system and the centralized remittance system in view of centralized remittance system network security layers or protocols (e.g., network firewall protocols).

The term "device" or "networked device" refers to computer hardware and/or software that is configured to access one or more services made available by a server. For example, in certain embodiments, the device is defined by computer hardware and/or software configured to access a service made available by a centralized remittance server of the centralized remittance system and/or is in communication with one or more networked devices of the centralized remittance system. In various circumstances, a device is associated with a third party system that is in communication with the centralized remittance system, such that the device has access to various functionalities of the centralized remittance system by way of a network. Devices may include, without limitation, smart phones, tablet computers, laptop computers, wearables, personal computers, enterprise computers, and/or the like.

The term "data structure" refers to a collection of data capable of being collectively transmitted, received, and/or stored. For example, a data structure is a collection of data elements stored and/or used by a centralized remittance system that is defined by a data format and associated with a common data structure identifier. A data structure is defined by a plurality of data elements. A data object may include a specific instance of information, and/or a grouping of information formatted according to the data structure definition. The term "third party identifier" refers to one or more items of data by which a third party business or organization may be uniquely identified. For example, a third party identifier may comprise ASCII text, a pointer, a memory address, and the like.

A "borrower" and similar terms are used interchangeably to refer to a person, firm, agency, and/or the like that has agreed to pay a debt, has an obligation to perform, and/or the like. As described herein, a borrower is a party to a loan transaction relating to a particular party through which the borrower is granted a loan by a third party entity that is a lender entity for a payment associated with the particular property. In certain embodiments, borrower data associated with the borrower defines at least a portion of a supported data structure associated with a property identifier, and includes, for example, borrower name, age, mailing address, borrower status (e.g., current, delinquent, etc.), company affiliation, co-borrower name, bankruptcy filing status, and/ or the like.

The term "identifier" is used to refer to one or more items of data by which a particular record, such as a transaction, loan account, third party entity, and/or the like is uniquely identified. For example, in certain embodiments, an identifier comprises ASCII text, a pointer, a memory address, and/or the like. In various embodiments, an identifier is indexed for purposes of identification, record-keeping, and data organization.

The terms "provider data," "policy data," and similar terms are used interchangeably to refer to data associated with a third party entity (e.g., an insurance provider) and corresponding to an insured property that may be communicated to and/or processed by a centralized remittance system. In certain embodiments, provider data embodies data associated with an identifier that relates to an insurance policy providing coverage over a particular property, the provider data being initially stored at the third party system operated by the third party insurance provider and received by the centralized remittance system. In certain embodiments, provider data includes data defining a data element and/or a collection of data defining a supported data structure that corresponds to, for example, an agent name, agent mailing address, policy number, premium, premium frequency, premium due date, coverage type, coverage details, lender details and/or the like associated with an identifier of the particular insurance policy.

The term "provider," "provider entity," "carrier," "insurance carrier," and similar terms are used interchangeably herein to refer to any company or agency that provides a guarantee of compensation for specified loss or damage in return for payment of a premium. In various embodiments, a provider entity is associated with a third party system operated by the provider entity, which generates and/or stores provider data and is in communication with a centralized remittance system. Providers include insurance carriers, data aggregators (e.g. companies or services which aggregate loan data, insurance data, property data, and other data), financial institutions that sell insurance, and/or the like.

A "requesting device" may include any networked computing device or server, such as associated with a third party entity that requests funds from a centralized remittance system and/or associated entity. For example, the requesting device may be associated with an insurance carrier and may transmit one or more request data objects, representative of invoices or billing invoices, toward the centralized remittance system for payments of insurance premiums.

A "carrier system" is defined by a collection of computing devices operated by the carrier, and may include the requesting device, one or more repositories, a user device with which a user interacts with the carrier system, and/or the like.

The "request data object" includes a data object representative of a request for payment, such as an invoice or bill. The request data object may be generated by a third party system such as a requesting device, and associated with an entity associated therewith, such as an insurance carrier. The request data object may include any data associated with an invoice for premium payment, such as policy data, a lender's escrow account information identifying the account from which payment is expected, a payment due date, and/or the like.

A "lender," a "lender entity," and similar terms are used interchangeably to refer to any company, business, organization, or agency that makes funds available to another for purchase or financing of a particular property according to certain terms and with the expectation that the funds will be repaid, generally plus any interest and/or fees. Lenders specifically include banks, financial institutions, underwriters, brokers, and others in the lender chain. In various embodiments, a lender is associated with a third party system operated by the lender entity, which generates and/or stores lender data and is in communication with the centralized remittance system.

A "remittance entity device" is any networked computing device or server, such as associated with a third party entity that directs or provides instructions for payment of funds from an associated bank account toward a centralized remittance system. For example, the remittance entity device may be associated with a lender that holds funds in escrow to pay insurance premiums on behalf of a borrower, and may transmit one or more remittance data objects, representative of instructions to direct payment of premium payments. In some instances the remittance entity device may be operated by a third party system that operates independently of the lender's system. For example, the remittance entity device may be operated by a service provider that performs certain processes on behalf of the lender and/or other financial institutions, related to payment services, record keeping services, and/or the like.

A "remittance account" may refer to a bank account held by a bank or other financial institution that holds funds that may be remitted towards the centralized remittance system. The remittance account may hold escrow funds paid to a lender as a part of a loan payment and/or mortgage payment. Funds from the remittance account may be transferred or remitted as directed by the remittance entity device.

A "remittance entity system" is defined by a collection of computing devices operated by the remittance entity, which may include a lender or a third party and/or service providers that provides certain services, including payment services, on behalf of the lender.

A "centralized remittance account" may refer to a bank account held by a bank or other financial institution that holds funds on behalf of the centralized remittance system. The centralized remittance account may hold funds paid from a remittance account to pay an insurance premium bill or invoice. Funds from the centralized remittance account may be transferred toward a carrier system and/or associated bank accounts.

A "recipient account" may refer to a bank account held by a bank or other financial institution that holds funds on behalf of the third party system associated with the entity that receives funds from the centralized remittance system. The recipient account may receive and hold funds paid from a centralized remittance system. Funds held in the recipient account may therefore be owned by an insurance carrier, as a collector of insurance premiums, and may be used to cover expenditures of the carrier, such as payment of claims, and/or the like.

A "financial system" may include any networked computing device, server, collection thereof, and/or the like that provides the infrastructure for a bank or other financial institution that holds funds on behalf of other entities or individuals. A financial system may be configured to enable the exchange of funds to and from other financial systems on behalf of an account owner.

A "multi-transaction server" is any networked computing device, server, collection thereof, and/or the like such as associated with a third party entity that provides payment services on behalf of the centralized remittance system. The multi-transaction server may therefore operate under a separate entity from that of the provider of the centralized remittance system. The multi-transaction server may receive as an input from the centralized remittance system, a multi-transaction data file, and direct remittance of funds from the centralized remittance account(s) to a recipient account(s) accordingly. The multi-transaction server may also provide a third party verification and modification user interface via an application accessible via the centralized remittance system to enable user interaction with components to direct approval, rejection and/or modification of certain data objects described herein. Data indicating statuses of payments may be transmitted by the multi-transaction server toward the centralized remittance system. Certain functionalities of the multi-transaction server may be exposed to other computing systems, such as third party systems, the centralized remittance system, and/or the like, via an API.

A "multi-transaction data file" is a collection of standardized transaction data objects, generated by the centralized remittance system in a format designated for the multi-transaction server. The multi-transaction data file may therefore comprise data regarding the payments to be made from the centralized remittance account to recipient accounts. When the multi-transaction server processes the multi-transaction file, payment is initiated from the centralized remittance account to recipient account.

System Architecture

Methods, apparatuses, systems, and computer program products of the present disclosure may be embodied by any of a variety of devices in various system architectures. For example, the method, apparatus, system, and computer program product of an example embodiment may be embodied by one or more network devices, such as a server or other entity, configured to communicate with one or more devices, such as third party systems and/or one or more third party servers. Example embodiments include a variety of networked devices operating as servers. Additionally, or alternatively, embodiment methods, apparatuses, systems, and/or computer program product of an example embodiment may be embodied by one or more software modules configured to perform some or all of the operations performed disclosed herein and executed on one or more hardware modules or systems, such as one or more servers connected to a network.

In this regard, FIG. 1A is a schematic block diagram of an example centralized remittance system that may be specially configured to communicate with one or more third party systems according to embodiments of the present disclosure. As illustrated, in various embodiments, an exemplary centralized remittance system 100 (e.g., the centralized remittance system 110) may be configured to communicate with each of a plurality of third party systems, such as, for example, third party systems 102A, 102B, 102C, 102D, 102E, and/or 102F, via one or more wireless or wired communication networks.

A communication network via which any of the components of FIG. 1A may communicate may include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, etc.). For example, communication network 108 may include a cellular telephone, an 802.11, 802.16, 802.20, and/or WiMax network. Further, a communication network configured to enable communication within the system of FIG. 1A may include a public network, such as the Internet, a private network, such as an intranet, or combinations thereof, and may utilize a variety of networking protocols now available or later developed including, but not limited to TCP/IP based networking protocols.

The centralized remittance system 100 may include at least one centralized remittance server(s) 110 accessible via the communication network. Collectively, the at least one centralized remittance server(s) 110 is configured for receiving data from, and/or transmitting data to, one or more third party systems 102A, 102B, 102C, 102D, 102E, and/or 102F. The centralized remittance server 110 of a centralized remittance system 110 may be configured, utilizing means such as one or more software and/or hardware modules, to perform various processes and/or execute various operations in order to facilitate payment remittance as described herein.

The centralized remittance system 100 encompasses one or more repositories 120, such as a centralized remittance repository which may define one or more cache memory storage areas and/or one or more long term storage areas, such as for storing various data objects such as or comprising request data object, remittance data objects, standardized transaction data objects, multi-transaction data files, property data, policy data, loan data, and/or the like. A repository 120 may further store certain status of data objects and/or standardized transaction data objects. For example, a request data object may be classified as unprocessed, scheduled/pending, complete and/or the like. Unprocessed may indicate the standardized transaction data object has not been transmitted to the multi-transaction server, whereas scheduled/pending indicates the corresponding data has been transmitted in a multi-transaction data file toward the multi-transaction server but can be edited before payment is remitted or cancelled. A complete status indicates payment has been remitted to the carrier from the centralized remittance account. The repository 120 includes information accessed and stored by the centralized remittance server 110 to facilitate one or more operations of the centralized remittance server 110 of the centralized remittance system 100 as described herein.

In various embodiments, an exemplary centralized remittance system 100 may further include one or more user devices 130 configured for communication with the centralized remittance server 110 and associated with a centralized remittance entity that operates the centralized remittance system 100 and/or a system user that is associated with the centralized remittance entity.

The one or more third party systems in electronic communication with the centralized remittance system 100 may be a software program, application, platform, or service that is provided by way of a remote device, such as a server or processing device, maintained by a third party individual, company, or organization, and which is configured to communicate with the centralized remittance system. In some embodiments, a third party system. In various embodiments, a third party system may communicate with the centralized remittance system, and vice versa, through one or more APIs. Accordingly, any third party system, such as a third party system associated with a new business or new business unit may integrate with the centralized remittance system 100 via the one or more APIs. In some embodiments, the third party system may receive tokens or other authentication credentials that are used to facilitate secure communication between the third party system and the centralized remittance system in view of centralized remittance system network security layers or protocols (e.g., network firewall protocols). As described herein, a third party system may include a third party server and a third party repository. For example, as illustrated in FIGS. 1, the centralized remittance system 100 may be configured for electronic communication with any number of third party systems including but not limited to a first third party system 102A, a second third party system 102B, a third party system 102C, a fourth third party entity 102D, and a fifth third party entity 102E, and/or a sixth third party entity 102E, each of which may include a respective third party server 101, 111, 121, 131, 141, and 151 and a third party repository 112, 122, 132, 142, 152, and 162 that is communicable with the respective third party server of the corresponding third party system. Further, in various embodiments, a third party system may include one or more devices configured for communication with the third party server associated with the corresponding third party system and associated with the third party entity that operates the corresponding third party system. For example, the third party systems 102A may include a user device 103 that is communicable with the respective third party server 101.

As described herein, a third party system may be associated with a third party entity, such as, for example, a lender or an insurance carrier. In various embodiments, wherein a third party system is associated with and/or operated by a third party entity comprising a provider entity, the third party server of the third party system may comprise a server configured to execute one or more software applications that are associated with and/or facilitate various data transfer and data storage processes (e.g., the transfer and/or storage of provider data and/or property data) associated with maintaining a plurality of insurance policies for a plurality of customers relating to a plurality of distinct subjects (e.g., property). In various embodiments, wherein a third party system is associated with and/or operated by a third party entity comprising a lender entity, the third party server of the third party system may comprise a server configured to execute one or more software applications that are associated with and/or facilitate various data transfer and storage processes (e.g., the transfer and/or storage of lender data and/or property data) associated with maintaining a plurality of loans for a plurality of customers relating to a plurality of distinct properties.

Figure 1B:
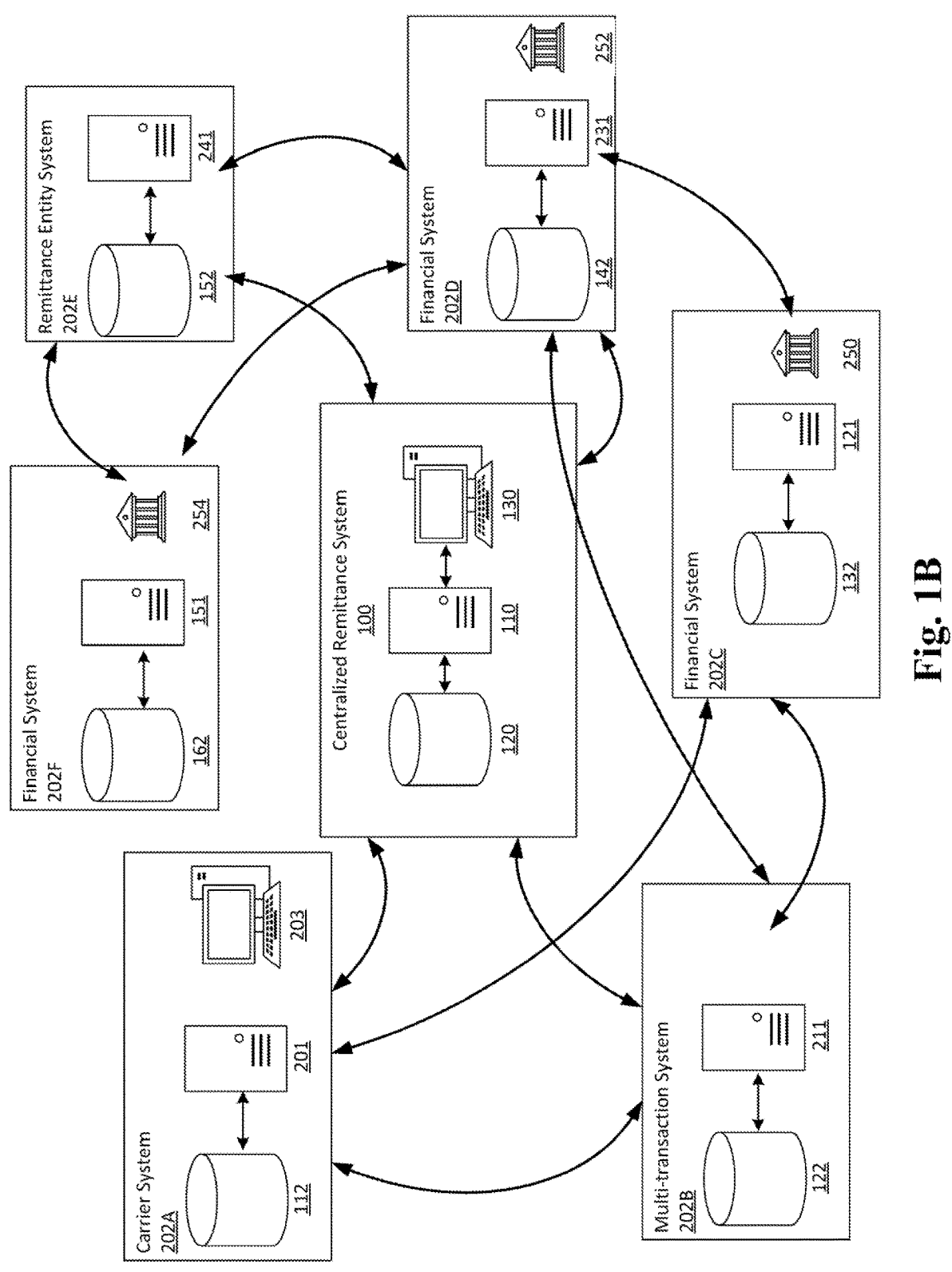
Figure 2:
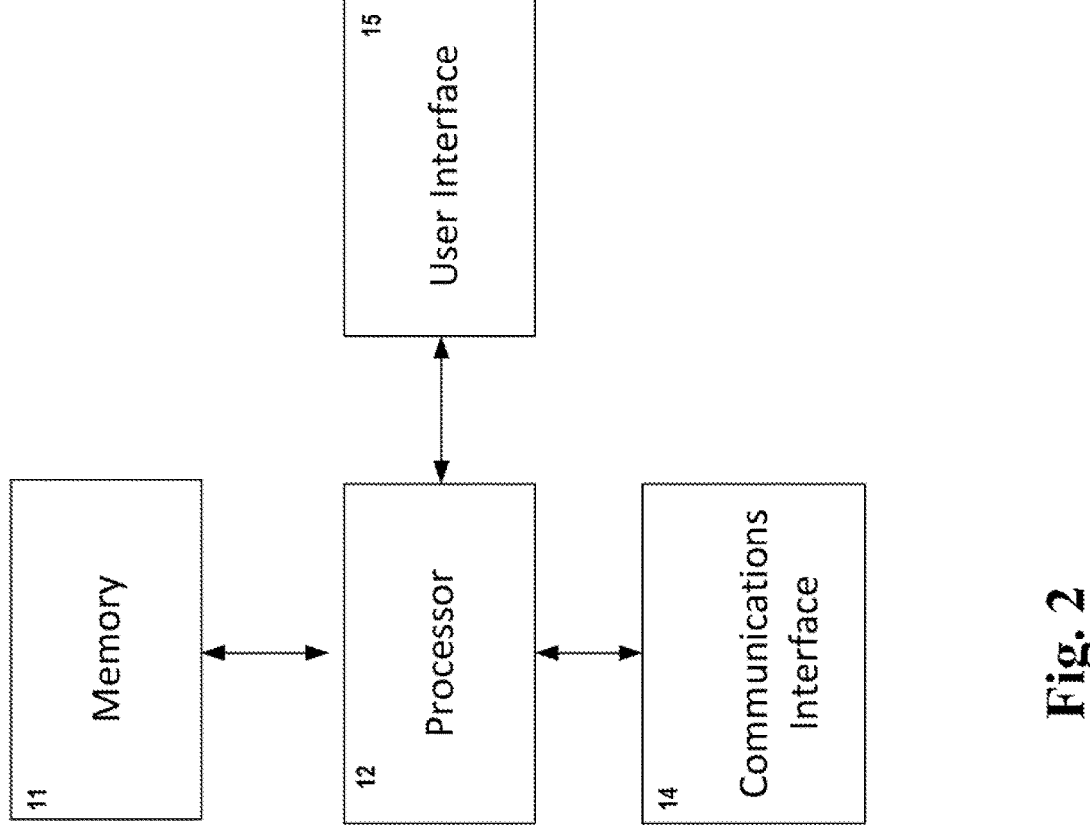
FIG. 2 is a block diagram of an apparatus in accordance certain example embodiments of the present disclosure.

FIG. 1B is a variation of FIG. 1A and is a schematic block diagram of a system in which example embodiments may operate. Some or all of the components described with respect to FIG. 1A may be included in the system of FIG. 1B.

FIG. 1B is a schematic block diagram of an example centralized remittance system that may be specially configured to communicate with one or more third party systems according to embodiments of the present disclosure. The carrier system 202A may implement or comprise similar computer devices as the third party system 102A and may be especially configured to provide infrastructure and support the operations of an insurance carrier. The carrier system 202A may a include repository 112, requesting device 201, user device 203, and/or additional servers, repositories, and/or devices. The requesting device 201 may transmit one or more request data objects, representative of invoices or billing invoices, toward the centralized remittance system for payments of insurance premiums. The user device 203 may enable access by one or more users of the carrier system to a multi-transaction system 202B, among other functionalities. The repository 112 may include policy data and/or the like.

The multi-transaction system 202B may implement or comprise similar computer devices as the third party system 102B and may be especially configured to provide third party infrastructure and support to the insurance carrier and/or centralized remittance system 100. For example, the multi-transaction system 202B may direct payments from a centralized remittance account to a recipient account, and/or provide an API to enable user-directed modification of payment details prior to an actual payment taking place. For example, the API may be exposed to the centralized remittance system 100 and/or carrier system 202A to enable users to modify payment details. The multi-transaction system 202B may include a multi-transaction server 211, and one or more repositories 112, and/or other servers, additional servers, repositories, and/or devices.

The financial system 202C may be operated by a bank or other financial system that holds various accounts, including one or more recipient accounts 250, on behalf of a carrier. The financial system 202C may implement or comprise similar computer devices as the third party system 102C. The recipient account(s) 250 includes the bank account in which the carrier receives payment of insurance premiums, as discussed in further detail herein. The financial system 202C including the repository 132 and server 121 provide the infrastructure for payments to be made to and from accounts of the financial institution, and recordkeeping thereof.

The financial system 202D may be operated by a bank or other financial system that holds various accounts, including one or more centralized remittance accounts 252, on behalf of the centralized remittance system 100. The centralized remittance account(s) 252 includes the bank account in which the carrier receives payment of insurance premiums, as discussed in further detail herein. In certain embodiments, separate centralized remittance accounts 252 may be utilized for each remittance account 254 expected to remit payments. The financial system 202C including the repository 142 and server 231 provide the infrastructure for payments to be made to and from its accounts, and recordkeeping related to the accounts and payments.

The remittance entity system 202E may implement or comprise similar computer devices as the third party system 102E and may be especially configured to provide infrastructure and support the operations of a lending institution that collects loan payments from borrowers and holds escrow funds therefrom for the payment of insurance premiums and other expenses relating to property ownership. In some example, the remittance entity system 202E provides third party infrastructure and support to the lender. For example, the remittance entity system 202E may be operated by any third party service provider that provides services for or on behalf of the lender. The remittance entity system 202E may include a repository 152, a remittance entity device 241, and/or other repositories, servers, and devices. The remittance entity system 202E, such as with the remittance entity device 241, provides remittance data objects to the centralized remittance system 100, including information regarding funds the remittance entity intends to pay toward the centralized remittance system 100 and/or carrier for the payment of insurance premiums.

The financial system 202F may be operated by a bank or other financial system that holds various accounts, including one or more remittance accounts 254, on behalf of a lender. In certain embodiments, the financial system 202F may be operated by the lender, or another financial institution. The financial system 202C may implement or comprise similar computer devices as the third party system 102F. The remittance account(s) 254 includes the bank account in which the lender holds funds received from borrowers for subsequent payment of insurance premiums, as discussed in further detail herein. The financial system 202F including the repository 162 and server 151 provide the infrastructure for payments to be made to and from accounts of the financial institution, and recordkeeping thereof. The financial system 202F may be configured to initiate payments from remittance account 254 toward centralized remittance accounts 252 (and/or the centralized remittance system).

It should be appreciated that, in some embodiments, one or more of the components of FIGS. 1A and/or 1B are combinable.

Example Apparatuses of the Disclosure

Having discussed example systems in accordance with the present disclosure, an example apparatus in accordance with the present disclosure will now be described. Apparatus 150 may implement any of the systems, servers, devices, and/or components of FIG. 1A, and/or 1B. Apparatus 150 includes memory 11, a processor 12, a communications interface 14, and an optional user interface 15.

Although some components are described herein with respect to functional limitations, it should be understood that the particular implementations necessarily include the use of particular computing hardware. It should also be understood that certain components described herein may include similar or common hardware. For example, two sets of circuitry for example, may both leverage use of the same processor(s), network interface(s), storage medium(s), and/or the like, to perform their associated functions, such that duplicate hardware is not required for each set of circuitry. The user of the term "circuitry" as used herein with respect to components of the apparatuses described herein should therefore be understood to include particular hardware configured to perform the functions associated with the particular circuitry as described herein.

Particularly, the term "circuitry" should be understood broadly to include hardware and, in some embodiments, software for configuring the hardware. For example, in some embodiments, "circuitry" includes processing circuitry, storage media, network interfaces, input/output devices, and/or the like. Alternatively or additionally, in some embodiments, other elements of the apparatus 150 may provide or supplement the functionality of another particular set of circuitry. For example, the processor 12 in some embodiments provides processing functionality to any of the sets of circuitry, the memory 11 provides storage functionality to any of the sets of circuitry, the communications interface 14 provides network interface functionality to any of the sets of circuitry, and/or the like.

In some embodiments, the processor 12 (and/or co-processor or any other processing circuitry assisting or otherwise associated with the processor) may be in communication with the memory 11 via a bus for passing information among components of the apparatus 150. In some embodiments, for example, the memory 11 is non-transitory and may include, for example, one or more volatile and/or non-volatile memories. In other words, for example, the memory 11 in some embodiments includes or embodies an electronic storage device (e.g., a computer readable storage medium). In some embodiments, the memory 11 is configured to store information, data, content, applications, instructions, or the like, for enabling the apparatus 150 to carry out various functions in accordance with example embodiments of the present disclosure. The memory 11 may include any repository discussed herein, such as but not limited to repositories 112, 120, 122, 132, 142, 152, and 162. In this regard, memory 11 and/or any of the repositories 112, 120, 122, 132, 142, 152, and/or 162 may comprise one or more databases configured for storing and/or indexing various data received, retrieved and/or generated. In some embodiments, the memory 11 and/or respective repository may be remote from, but in connection with, apparatus 150.

The processor 12 may be embodied in a number of different ways. For example, in some example embodiments, the processor 12 includes one or more processing devices configured to perform independently. The processor 12 may comprise a specially configured field programmable gate array (FPGA), or a specially programmed application specific integrated circuit (ASIC), to perform functionality described herein. Additionally or alternatively, in some embodiments, the processor 12 includes one or more processor(s) configured in tandem via a bus to enable independent execution of instructions, pipelining, and/or multithreading. The use of the terms "processor" and "processing circuitry" may be understood to include a single core processor, a multi-core processor, multiple processors internal to the apparatus 150, and/or one or more remote or "cloud" processor(s) external to the apparatus 150.

In an example embodiment, the processor 12 may be configured to execute instructions stored in the memory 11 or otherwise accessible to the processor. Alternatively or additionally, the processor 12 in some embodiments is configured to execute hard-coded functionality. As such, whether configured by hardware or software methods, or by a combination thereof, the processor 12 may represent an entity (e.g., physically embodied in circuitry) capable of performing operations according to an embodiment of the present disclosure while configured accordingly. Alternatively or additionally, as another example in some example embodiments, when the processor 12 is embodied as an executor of software instructions, the instructions may specifically configure the processor 12 to perform the algorithms embodied by the specific operations described herein when the instructions are executed.

In various embodiments, the processor 12 may include hardware, software, firmware, and/or a combination thereof, configured to support various functionalities as described herein. As one particular example, the processor 12 may be configured to perform various operations centralized remittance functionality. In this regard, the processor 12 in some embodiments is configured to perform and/or otherwise support the various functionality performed by the centralized remittance system 100, as described herein.

The user interface 15 provides output to the user and, in some embodiments, receives one or more indication(s) of user input. In some embodiments, the user interface 15 is in communication with processor 12 to provide such functionality. The user interface 15 includes one or more user interface(s) and/or includes a display that may comprise the user interface(s) rendered as a web user interface, an application interface, and/or the like, to the display of a user device, a backend system, or the like. In some embodiments, the user interface 15 may also include a keyboard, a mouse, a joystick, a touch screen, touch areas, soft keys, a microphone, a speaker, or other input/output mechanisms. The processor 12 and/or user interface 15 comprising or otherwise interacting with the processor 12 may be configured to control one or more functions of one or more user interface elements through computer program instructions (e.g., software and/or firmware) stored on a memory 11 accessible to the processor 12 (e.g., stored on memory 11, and/or the like).

The communications interface 14 includes any device, circuitry, and/or other means embodied in hardware, software, firmware, and/or a combination of hardware, software, and software, that is configured to receive and/or transmit data from/to a network and/or any other device, circuitry, or module of or in communication with apparatus 150. In this regard, the communications interface 14 may include, for example, a network interface for enabling communications with a wired or wireless communication network. For example, the communications interface 14 in some embodiments includes one or more network interface card(s), antenna(s), bus(es), switch(es), router(s), modem(s), and supporting hardware and/or software, or any other device suitable for enabling communications via one or more communication network(s). Additionally or alternatively, in some embodiments the communications interface 14 includes circuitry for interacting with the antenna(s) and/or other hardware or software to cause transmission of signals via the antenna(s) or to handle receipt of signals received via the antenna(s).

As described above and as will be appreciated based on this disclosure, embodiments of the present invention may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory 11, optical storage devices, or magnetic storage devices.

Example Embodiments

Figure 3A:
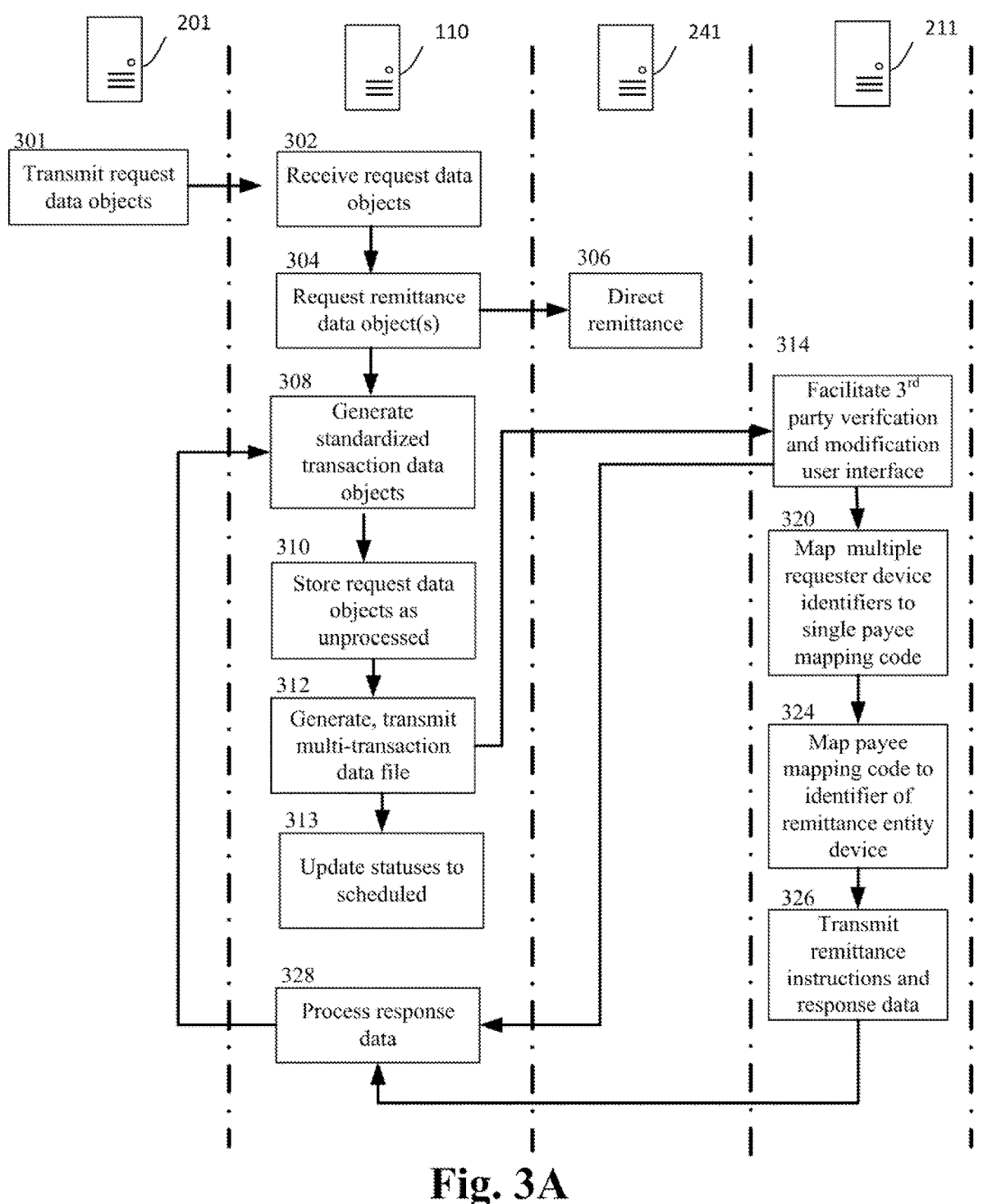
FIGS. 3A and 3B are diagrams showing functionality of various components in accordance with various embodiments.

FIG. 3A is a lane diagrams showing functionality of various components in accordance with various embodiments. In particular, FIG. 3A illustrates at least portions of executable actions and communicative signals provided between a centralized remittance system 100 and other third party systems in communication therewith. The components of FIG. 3 may communicate via respective communications interfaces 14.

In FIG. 3A, operation 301, apparatus 150 embodied by a carrier system 202A, and/or requesting device 201, includes means, such as memory 11, processor 12, communications interface 14, and/or the like, for causing transmission of request data objects, such as a data object representation of a request for payment of insurance premiums, and/or billing invoices towards the centralized remittance system 100 and/or centralized remittance server 110.

The requests data object(s) represent billing invoices and may include any policy data relating to policies having premiums due or premiums scheduled to be paid, including but not limited to policy holder (e.g., borrower), policy numbers, amount due, banking routing number and/or account number of the remittance account, such as a lender's escrow account details, banking routing number and account number of the recipient account of the carrier, and/or the like.

In operation 302, apparatus 150 embodied by a centralized remittance system 100 and/or centralized remittance server 110 includes means, such as memory 11, processor 12, communications interface 14, and/or the like, for receiving request data objects, transmitted in operation 301, from the requesting device 201.

In operation 304, apparatus 150 embodied by a centralized remittance system 100 and/or centralized remittance server 110 includes means, such as memory 11, processor 12, communications interface 14, and/or the like, for requesting remittance data object(s) from a remittance entity device(s) based on the request data objects. In this regard, example embodiments request payment of the invoices to a lender or servicer thereof to initiate payments to be made toward the centralized remittance system 100 and/or centralized remittance server 110. A request data object may represent a request for funds to be transferred and may indicate a total amount of premiums to be paid by the lender to cover one or more premiums, possibly toward different carriers, but added as a sum. The sum may cover premiums to be paid for a period of time, such as a days' worth of payments. In this regard, the process of FIG. 3A, including the request for remittance data object(s) toward respective remittance entity devices 241 grouped together per lender and/or remittance entity devices 241 may be repeated on a daily basis or similar interval, and for each lender, and/or remittance entity device 241.

In operation 306, apparatus 150 embodied by the remittance entity system 202E and/or remittance entity device 241 includes means, such as memory 11, processor 12, communications interface 14, and/or the like, for directing remittance of funds from a remittance account 254, held on behalf of the remittance entity, or lender, to the centralized remittance account 252. Although the transfer of funds is not illustrated in FIG. 3A, it will be appreciated that the electronic funds transfer occurs according to processes known to one of ordinary skill in the art, including processes such as automated clearinghouse (ACH), bank wire, and/or the like. According to certain embodiments, separate ACH transfers may be made for each payment. However in certain embodiments, a receiving carrier system 202A and/or associated financial system 202C be configured to receive combined ACH payment, such as daily ACH payments, and be configured to receive such payments per lender and/or as a combined ACH per lender. In some embodiments, the electronic funds transfer may be selected automatically or via presentation of a graphical user interface (GUI) with selectable options to a user. For example, a user associated with the carrier system 202A and/or financial system 202C could make the selection to configure separate or combined ACH payments by accessing a verification and modification interface of multi-transaction server 211. According to certain embodiments, a lender may send a single payment each day, for example, covering all scheduled payments due for any of their accounts for which the funds are held in escrow, even if the payments are targeted for different carriers.

Figure 4B:
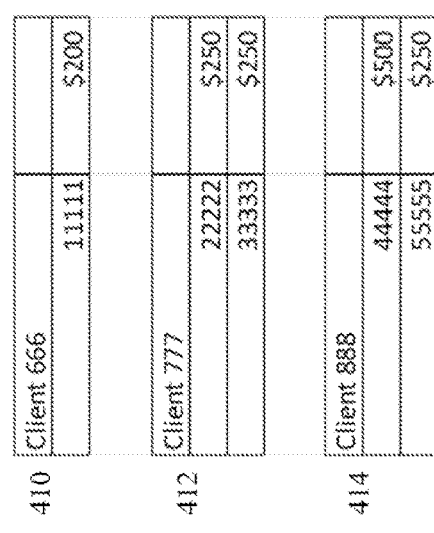
FIGS. 4A-4F are representations of data and funds in accordance certain example embodiments of the present disclosure.
Figure 4A:
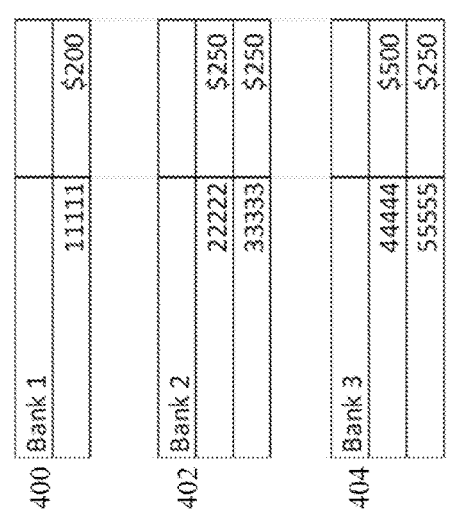

FIG. 4A provides an example data representation of funds transferred from three respective remittance accounts 254 to the centralized remittance account 252, in three respective and separate payments 400, 402, and 404, which may be transferred for the purpose of further remittance toward a carrier for payment of 5 insurance premiums. FIG. 4A further provides a ledger for each payment indicating a breakdown of how the payments are to be allocated. As directed according to the remittance data objects, Bank 1 remits $200 and is associated with a requester device identifiers (e.g., a payee code) of 11111, indicating how the remittance entity system identifies a payee to which the payment is to be made. Bank 2 remits one payment totaling $500, with a ledger reflecting payments on behalf of two accounts, associated with respective requester device identifiers 22222 and 33333 and amounts of $250 each. Bank 3 remits a payment totaling $700 payments, with a ledger reflecting payments of $500 and $250 identified by respective requester device identifiers 44444 and 55555. FIG. 4A is a non-limiting example, and funds transferred from accounts at respective Bank 1, Bank 2, and Bank 3, may be registered to respective lenders and held by respective financial institutions for the payment of insurance premiums towards the carrier, via the centralized remittance account 252 as directed by remittance entity device 241, remittance entity system 202E, and/or the like. In this regard, the funds represented in FIG. 4A are transferred as a result of operation 306.

FIG. 4B provides an example data representation of funds received at the centralized remittance account 252. In this regard, the centralized remittance server 110 may recognize the payments 410, 412, and 414 as being received in 3 respective centralized remittance accounts 252 from clients 666, 777 and 888. The data representation of the payments indicates respective ledgers including requester device identifiers and data objects associated therewith (e.g., amounts).

Figure 3B:
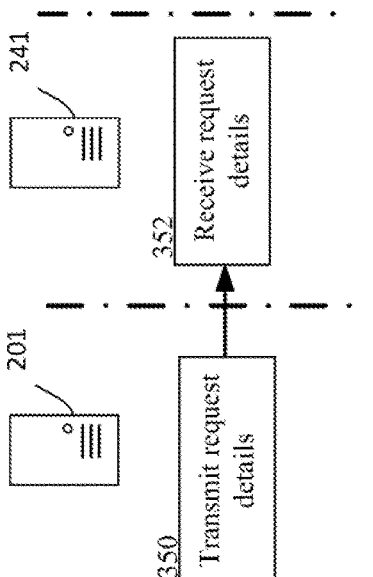

The data representations of FIGS. 4A and 4B represent the funds transferred from remittance accounts 254 to the centralized remittance accounts 252 as a result of the request for remittance data objects communicated from the centralized remittance server 110 to the remittance entity device 241. It will be appreciated that additional communications relating to invoicing and recordkeeping may optionally be provided from a requesting device 201 to respective remittance entity devices 241. FIG. 3B is an optional flowchart of operations that may be performed according to certain embodiments during and/or in addition to execution of certain operations of FIG. 3A. In operation 350, apparatus 150 embodied by the carrier system 202A and/or requesting device 201, may include means, such as memory 11, processor 12, communications interface 14, and/or the like, for transmitting request details, such as but not limited to invoices, to the remittance entity system 202E and/or remittance entity device 241. In operation 352, apparatus 150 embodied by remittance entity system 202E and/or remittance entity device 241 may include means, such as memory 11, processor 12, communications interface 14, and/or the like, for receiving the request details, such as but not limited to invoices. The invoices may be optionally communicated from the carrier to the remittance entity system 202E to enable the remittance entity system 202E to perform optional reconciliation, recordkeeping, and/or the like, such as to reconcile total payments requested by the centralized remittance server 110 with individual premium invoices, for example, but it will be appreciated that the remittance entity device 241 directs payment according to the request data objects and the total requested amounts provided by the centralized remittance server 110, as described with respect to operation 304.

Returning to the description of FIG. 3A, in operation 308, apparatus 150 embodied by a centralized remittance system

100 and/or centralized remittance server 110 includes means, such as memory 11, processor 12, and/or the like, for generating standardized transaction data objects. The processor 12 of the centralized remittance server 110 may generate the standardized transaction data objects in a variety of ways. The processor 12 may include data explicitly provided in the request data objects indicating payment amounts, payment dates, policy data (e.g., policy number, payment amount, effective term, etc.), loan information (e.g., borrower name, loan number, property, etc.), servicing system (e.g., peril line covered, etc.), and/or the like. In some embodiments, the standardized transaction data objects may be assembled from data retrieved from a plurality of computing systems and/or databases (e.g., a centralized remittance system, one or more financial systems, one or more carrier systems, one or more multi-transaction systems, and/or one or more remittance entity systems). Additionally and/or alternatively, the processor 12 may infer certain data based on the sender of corresponding request data objects or data contained therein. For example, the processor 12 may insert in each standardized transaction data object, an identifier of a particular carrier system 202A, carrier's bank account, such as the recipient account 250, and/or the like, based on information identifying the sender, or carrier, of a corresponding request data object received with respect to operation 302. The generation of the standardized transaction data objects may be performed as the request data objects are received, and/or the request data objects may be stored and/or batched in certain embodiments, and corresponding standardized transaction data objects generated on a routine basis such as hourly or nighty. Various implementations may be contemplated.

In operation 310, apparatus 150 embodied by a centralized remittance system 100 and/or centralized remittance server 110 includes means, such as memory 11, processor 12, and/or the like, for storing request data objects and/or standardized transaction data objects as unprocessed data objects for a period of time over which request data objects are received from various carrier systems 202A, and/or requesting devices 201. The standardized transaction data objects may therefore be batched for further processing in operation 312, described below. It will be appreciated that in certain embodiments operations 310 and/or 312 may be combined and/or reversed. For example, received request data objects may be batched and stored as unprocessed, then subsequently processed to generate the standardized transaction data objects as described with respect to operation 308. Several variations may be contemplated.

Regardless of the above described variations in implementation, upon a regular or predefined interval, such as daily or nightly, in operation 312, apparatus 150 embodied by a centralized remittance system 100 and/or centralized remittance server 110 includes means, such as memory 11, processor 12, communications interface 14, and/or the like for generating and transmitting a multi-transaction data file. In this regard, multiple standardized transaction data objects are batched and loaded into a single instance of a multi-transaction data file, which may contain payment details from numerous lenders to be paid toward numerous carriers. According to certain example embodiments, the multi-transaction data file may be generated as follows. The centralized remittance server 110 and/or a subsystem thereof pulls necessary data points from an incoming payment acceptance file from the remittance entity device 241, policy/loan data, and generates unique payment request identifier(s) and other specific fields for the multi-transactional data file. The multi-transaction data file may include data points required for various payment methods, including but not limited to ACH. The multi-transaction data file may further include payee codes, which may be generated by the centralized remittance system 100 and/or centralized remittance server 110, and are also identifiable by the multi-transactional server 211 as mapped to various payees and are discussed in further detail below. The multi-transactional data file may be encrypted and delivered via Secure File Transfer Protocol (SFTP), picked up by the multi-transactional server, and encrypted at rest there.

A multi-transaction file is transmitted to the multi-transaction server 211 and may be transmitted on a routine basis such as daily, nightly, or several times throughout the day, for example.

Figures 4C, 4D, 4E, 4F:
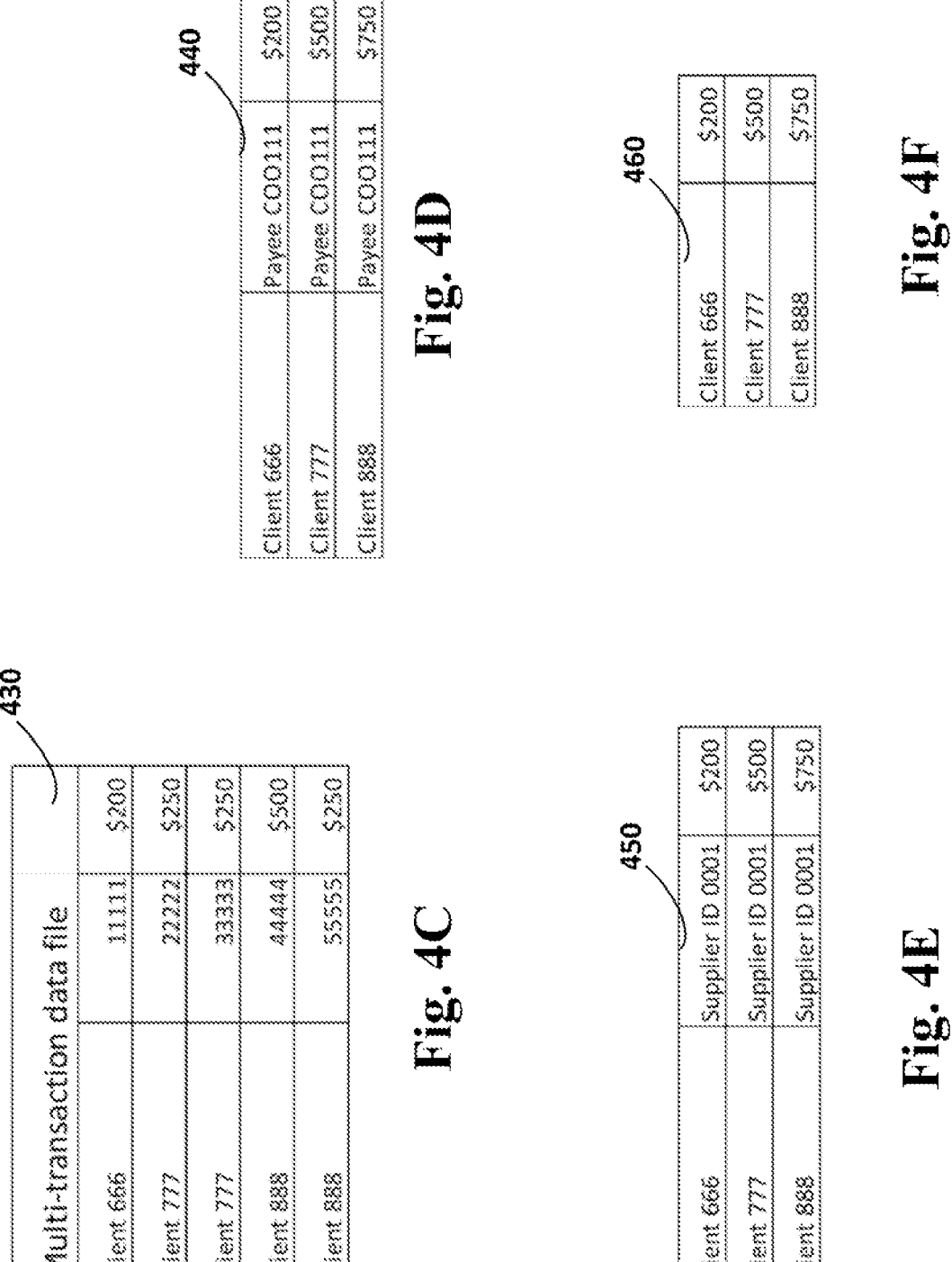

FIG. 4C provides an example multi-transaction data file 430 generated by the centralized remittance account 252 according to certain example embodiments. The multi-transaction data file includes flat data, such that a row indicates a respective payment expected to be remitted on behalf of a lender toward a carrier. The multi-transaction data file of FIG. 4C includes centralized remittance account identifiers of Client 666, Client 777, and Client 888 identifying three centralized remittance accounts from which funds are to be remitted, respective requester device identifier used by the client or lender to identify a recipient (e.g., carrier), and a respective amount. The transmission of the multi-transaction data file to the multi-transaction server 211 represents the signaling of the multi-transaction server to direct payments from respective centralized remittance accounts 252 to recipient accounts 250.

In this regard, at operation 313, apparatus 150 embodied by the by centralized remittance system 100 and/or centralized remittance server 110 includes means, such as memory 11, processor 12, and/or the like, for updating or storing a status of an associated standardized transaction data object and/or request data object as scheduled in the centralized remittance repository 120. The associated payment is therefore pending with the multi-transaction server and can be edited, approved and/or rejected via a third party verification and modification user interface described in further detail below.

As shown in operation 314, apparatus 150 embodied by the multi-transaction server 211, includes means, such as memory 11, processor 12, communications interface 14, user interface 15 and/or the like, for facilitating provision of a third party verification and modification user interface of the multi-transaction server 211. The third party verification and modification user interface is enabled at least partially by the centralized remittance system 110 and the provision of the multi-transaction data file toward the multi-transaction server 211. The third party verification and modification user interface enables review and/or modification of payments while the payment is pending and/or scheduled. FIG. 5A provides an example third party verification and modification user interface that may be provided by the multi-transaction server while a payment is pending and/or scheduled. In some embodiments, the standardized transaction data object comprises all information for the verification and modification user interface (e.g., without requiring other data transmissions associated with the particular transaction).

A user, such as a user of the carrier system 202A, such as with user device 203, may access a user interface such as that of FIG. 5A using logon credentials. The user interface may include a search bar 502, presenting the option for the user to provide any number of search parameters. Transactions (including scheduled, pending, and/or rejected transactions)

actions) 504 to the carrier meeting the search criteria are displayed on the user interface and may relate to the transactions and ledger data of FIGS. 4A-4F. The transactions 504 may include a unique identifier recognizable to the carrier system 202A, such as but not limited to a policy number recognizable to the carrier system 202A, and a quantity, such as but not limited to a quantity of tender or currency to be transacted, an invoiced amount and/or amount to be paid. The transactions 504 may further include a creation date, a transaction date on which the transaction is expected to occur, such as but not limited to a payment data funds are expected to be received at the carrier, and a transaction status. For each transaction the user interface may include a selectable component by which the user can select to view payment details and/or edit the transaction. For example, the unique identifier shown with underlining in FIG. 5A provides a selectable link to access transaction details. Using the user third party verification and modification user interface of FIG. 5A, the user can select any of the selectable components of the displayed transactions and the user interface display transitions to a display such as of FIG. 5B.

Although not depicted in the figures, it will be appreciated that registration of a user, such as a carrier and/or associate thereof, may be facilitated and/or initiated with the system according to the following example use case. A user of the centralize remittance system may provide initial contact information and entity identifying information of a carrier the centralized remittance system wants to invite to utilize the third party verification and modification user interface.

A user may receive a welcome email with a link a registration page to access the third party verification and modification user interface. The user may be prompted to register using an email, password verification processor, preferred contact method (email or text). The user receives confirmation such as email and/or a one-time password to complete registration. A user can then input their business name, address, country, tax identifier, business representative name, and/or the like, to enable identity verification. The user can then setup payment types and confirm details, access the third party verification and modification user interface to reject, approve, and/or modify payments as discussed herein.

Using the third party verification and modification user interface display such as that of FIG. 5B, a user may edit a transaction or payment amount in area 510, such as based on a change in policy terms, and save changes by selecting component 520. The transactions that may be edited may include those provided in the multi-transaction data file, for example. A user can review the transactions communicated via the multi-transaction data file, approve a transaction or payment with component 512, or reject a payment with component 514, due to policy cancellation, payment already received, or other reason, and insert an optional reason in area 516. In certain embodiments, an auto-approval feature may be configured, such that an unapproved payment is considered approved after a certain time threshold, such as one business day. According to such an auto-approval feature, such payments will proceed to be processed as discussed in further detail herein, after the one day.

It will be appreciated that the third party verification and modification user interface displays, such as those of FIGS. 5A and 5B may include additional fields, and/or enable transitions to additional display views or pages of the third party verification and modification user interface. For example, users may edit payment methods between any number of options such as but not limited to wire, ACH, check and/or the like. Additionally functionality may be enabled by the third party verification and modification user interface, such as creating payments, downloading payments to a local file, and/or the like. The third party verification and modification user interface may provide extensive access to payment details, including access to past payments, which may be filtered by any number of search criteria, and/or the like. Various functionality may be contemplated to be enabled via the third party verification and modification user interface.

Figure 5C:
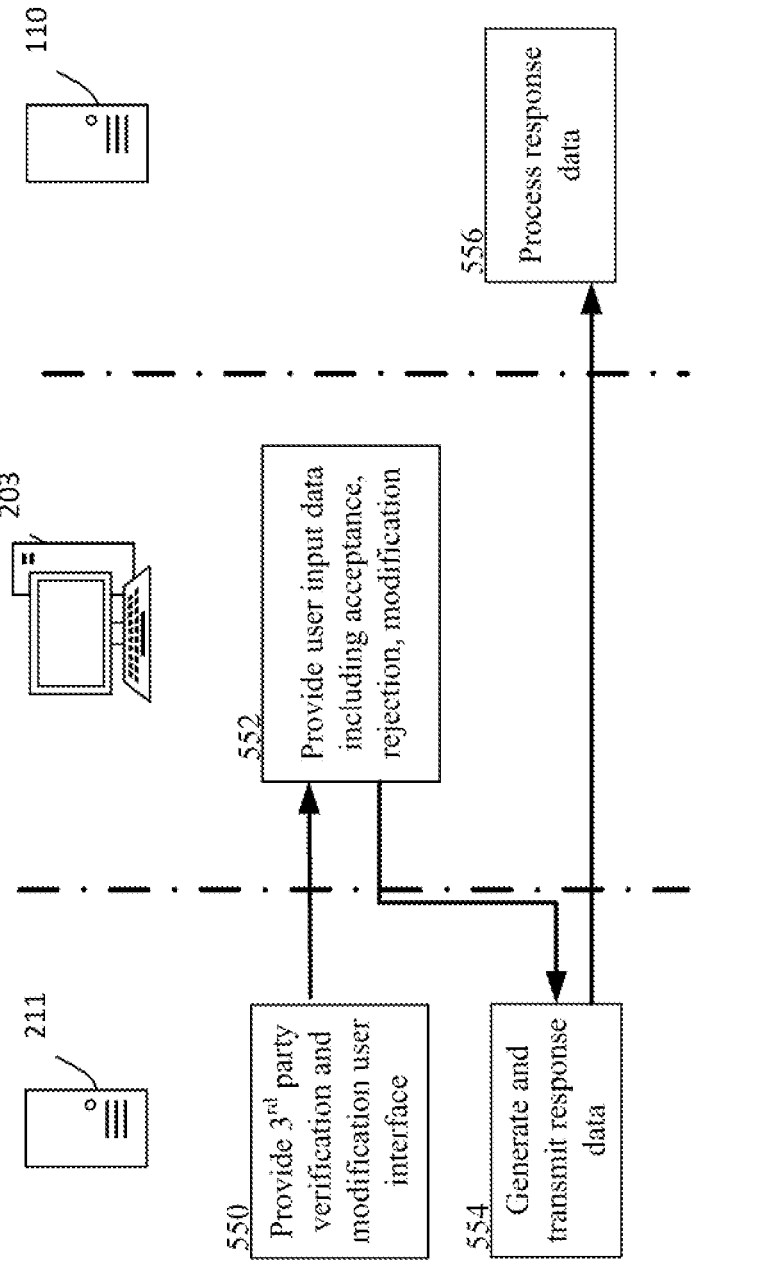
FIG. 5C is a diagram showing functionality of various components in accordance certain example embodiments of the present disclosure.

FIG. 5C is a lane diagram illustrating operations relating to the provision of a third party verification and modification user interface according to certain embodiments provided herein. The operations of FIG. 5C may be performed in parallel, or in conjunction with other operations discussed herein, such as but not limited to operations 312, 314, 328, of FIG. 3A, and/or the like. In this regard, the multi-transaction data file includes transactions initially in a pending status that can be edited and/or modified prior to completion. Additionally or alternatively, the third party verification and modification user interface and corresponding operations of FIG. 5C can be performed after a transaction is complete, thereby initiating a reversal, such as but not limited to a refund of funds. Example embodiments therefore enable user input via the third party verification and modification user interface, to edit, cancel, and/or correct a transaction either before or after the transaction has been completed and/or payment made to the recipient account 250.

In any event, in operation 550, apparatus 150 embodied by the multi-transaction server 211 includes means, such as memory 11, processor 12, communications interface 14, user interface 15 and/or the like, for providing the third party verification and modification user interface. In certain embodiments, the third party verification and modification user interface is provided via an API to the centralized remittance system 110, such that the third party verification and modification user interface is accessed by a user accessing the centralized remittance system 110. In any event, a user of the carrier system 202A, such as with user device 203, accesses the third party verification and modification user interface.

In operation 552, apparatus 150 embodied by the user device 203 includes means such as memory 11, processor 12, communications interface 14, user interface 15 and/or the like, for providing user input data, including acceptance, rejection, and/or modification of payments toward the multi-transaction server 211. The user input data may therefore be communicated via an application operative on the multi-transaction system 202B, and/or optionally via an API, and accessed by the user device 203.

In operation 554, apparatus 150 embodied by the multi-transaction server 211 includes means, such as memory 11, processor 12, and/or the like, for generating and transmitting response data toward the centralized remittance server 110. The response data reflects the user input and may include a status such as accepted or rejected, along with a reject reason, if applicable. In certain embodiments, the response data is transmitted in a response data file that may correspond with transactions transmitted in the multi-transaction data file. For example, if a multi-transaction data file includes 100 requests on and 10 are rejected, the response data file may reflect 90 accepted and 10 rejected for a total of 100 responses. In some embodiments, the response file may include a same number of responses (e.g., whether accepted or rejected) as the multi-transaction data file.

In operation 556 of FIG. 5C, and operation 328 of FIG. 3A, apparatus 150 embodied by the centralized remittance server 110 includes means, such as memory 11, processor 12, communications interface 14 and/or the like, for processing the response data. In certain embodiments and/or scenarios, when the response data indicates a payment is complete, a status of the associated request data object and/or transaction data object is updated to complete. The response data relating to rejected or modified payments may be processed in a variety of ways by the centralized remittance server 110, including dependent on whether or not the payment was remitted to the recipient account 250. The further processing of the response data is discussed in further detail below with respect to FIG. 6.

In certain embodiments, a certain period of time may lapse, such as one day, following receipt of the multi-transaction data file and transmittal of remittance instruction, enabling verification, modification and/or rejections to be entered via the third party verification and modification user interface. This intentional and strategic holding period and delay improves the efficiency of the overall system. Any perceived downside in holding payment remittance in comparison to any implementation relying on an immediate one-in-one out transfer of funds, may be outweighed by the improvement in efficiency gained by reducing the number of incorrect payments remitted towards the carrier by allowing the carrier to verify, modify, and/or reject payments.

Returning to the description of FIG. 3A, following or during the facilitation of the third party verification and modification user interface and the corresponding generation and transmission of response data that may be generated as an output of third party verification and modification activity, additional processing of the multi-transaction data file and contents therein may be performed by the multi-transaction system 202B.

Following a period of optional third party verification and modification activity during which payments are scheduled and/or pending, for payments that are approved or otherwise not rejected, apparatus 150 embodied by multi-transaction server 211, at operation 320 includes means, such as memory 11, processor 12, communications interface 14 and/or the like, for mapping groups of payments for multiple identifiers that identify multiple requester devices, such as but not limited to payee codes, to a single payee mapping code. The repository 122 may track which requester device identifiers are associated with which payee mapping codes and group the respective payments accordingly. As illustrated in FIG. 4D, payments 440, including the 2 transactions associated with requester device identifier 22222 (which may be referred to as payee code 22222), and requester device identifier 33333 (which may be referred to as payee code 33333) are mapped to a single payee mapping code, C00111. As described herein, the centralized remittance server 110 selects the unique mapping code to be used for each carrier and assigns when sending the registration link to the requesting device 101. The payee mapping code is then stored by the multi-transaction server 211, and the payee mapping code is utilized in future transactions. Payee codes are then mapped to the payee mapping code for the carrier/agent.

In operation 324, apparatus 150 embodiments by multi-transaction server 211, at operation 316 includes means, such as memory 11, processor 12, communications interface 14 and/or the like, for mapping the payee mapping code to an identifier of a remittance entity device, such as but not limited to the example bank supplier identifier Supplier ID 0001, as illustrated by payments 450 in FIG. 4E. In this regard, a mapping of the payee code and setup of the payee within the multi-transaction server 211 indicates payment methods for the payee.

In operation 326, apparatus 150 embodied by the multi-transaction server 211 includes means, such as memory 11, processor 12, communications interface 14 and/or the like, for transmitting remittance instructions for funds to be transmitted from the centralized remittance account 252 to respective recipient accounts 250 associated with respective carriers, and to transmit response data to the centralized remittance server 110. In certain embodiments, the multi-transaction data file is parsed, then the remittance instructions and response data transmitted to the centralized remittance server 110.

The instructions initiating the transfer of funds may reflect modifications that were entered via the third party verification and modification user interface. The data in the multi-transaction data file may be parsed and converted to a batch API request that initiates payment. Funds are transferred from the centralized remittance accounts 252 identified by the identifier of a remittance entity device, such as a bank supplier identifier, such as the example Supplier ID 0001 of FIG. 4E, to the recipient accounts 250. Proceeding with the example illustrated in FIGS. 4A-4E, the corresponding 3 transfers 460 illustrated in FIG. 4F are received at a recipient account 250 and cover the payments for 5 premium payments illustrate in FIG. 4A, paid from 3 remittance accounts, or lenders. According to certain embodiments, instruction responses may be transmitted to the centralized remittance server 110 as indicated by the arrow from operation 326 to operation 328. The centralized remittance server 110 may further reconcile the instructions responses and/or store the instructions responses for record keeping.

As illustrated in the example of FIGS. 4A-4F, 3 payments are transferred to the carrier system that cover premium payment toward 5 policies. The example data and funds transfer illustrated in FIGS. 4A-4F is a simplified example according to example embodiments. In practice, the centralized remittance system may facilitate the routing and payment of thousands of payments, such as thousands of premium payments per day, from hundreds and/or thousands of loan servicers, lenders, and/or the like, and to hundreds of carriers per day, such that the reduction in transactions occurring in the system is exacerbated. On this larger scale, the improved efficiency gained by implementing example embodiments disclosed herein is significant in many stages of the payment lifecycle to many stakeholders. Still further, the provision of the third party verification and modification user interface of FIG. 5B enables a user of the carrier to view payment details for payment of the 5 policies, despite only 3 associated payments being transferred. Providing the broken down payment view or policy level payment detail via a user interface rather than facilitating the actual transfer of each individual payment in a separate wire, ACH, and/or other bank transfer further improves efficiency throughout the system while offering verification services.

Figure 6:
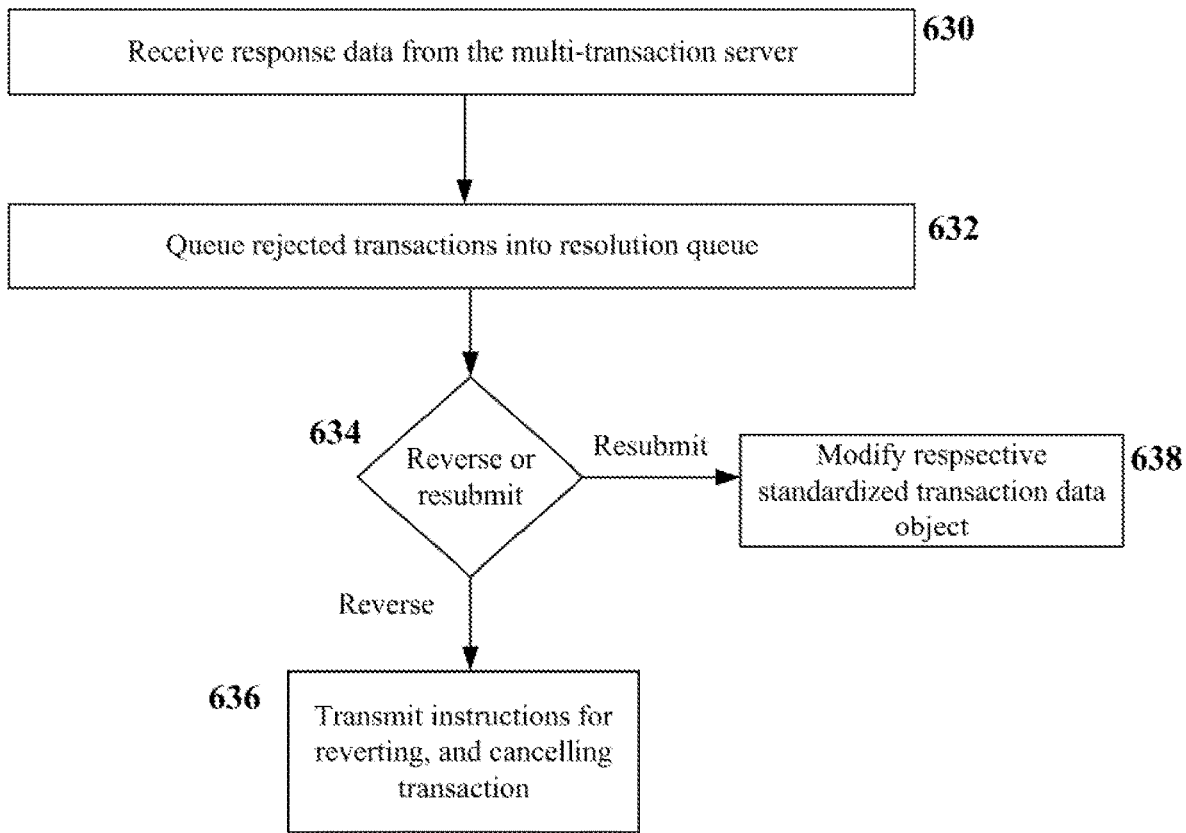
FIG. 6 is a flowchart depicting operations performed in accordance certain example embodiments of the present disclosure.

Continuing with the operations performed according to example embodiments, FIG. 6 is a flowchart of operations that may be performed by a centralized remittance server 100 and/or a centralized remittance server 110 for processing response data received from the multi-transactional server 211. In operation 630, apparatus 150 embodied by centralized remittance server 110 includes means, such as memory 11, processor 12, communications interface 14 and/or the like, for receiving response data from the multi-transaction server.

For response data indicating a rejected transaction, such as indicated by a user via the third party verification and modification user interface of FIG. 5B, at operation 632 apparatus 150 embodied by centralized remittance server 110 includes means, such as memory 11, processor 12, communications interface 14 and/or the like, for queueing rejected transactions into a resolution queue. The associated record in the resolution queue may include details of the transaction data object with the associated rejection, and/or a reference thereto, and may further include response data from the multi-transactional server 211 such as a status of rejected, and an optional reject reason. A resolution queue may be stored on repository 120, enabling a user, such as with a user device 130, to access the associated transaction details via resolution interface and perform resolution related activities if necessary, such as following up with the carrier, issuing a reversal, which may include or be referred to as a refund, towards the remittance entity device, such as one associated with a lender, correcting certain details of the transaction, and resubmitting the transaction, payment, and/or the like.

Figure 7:
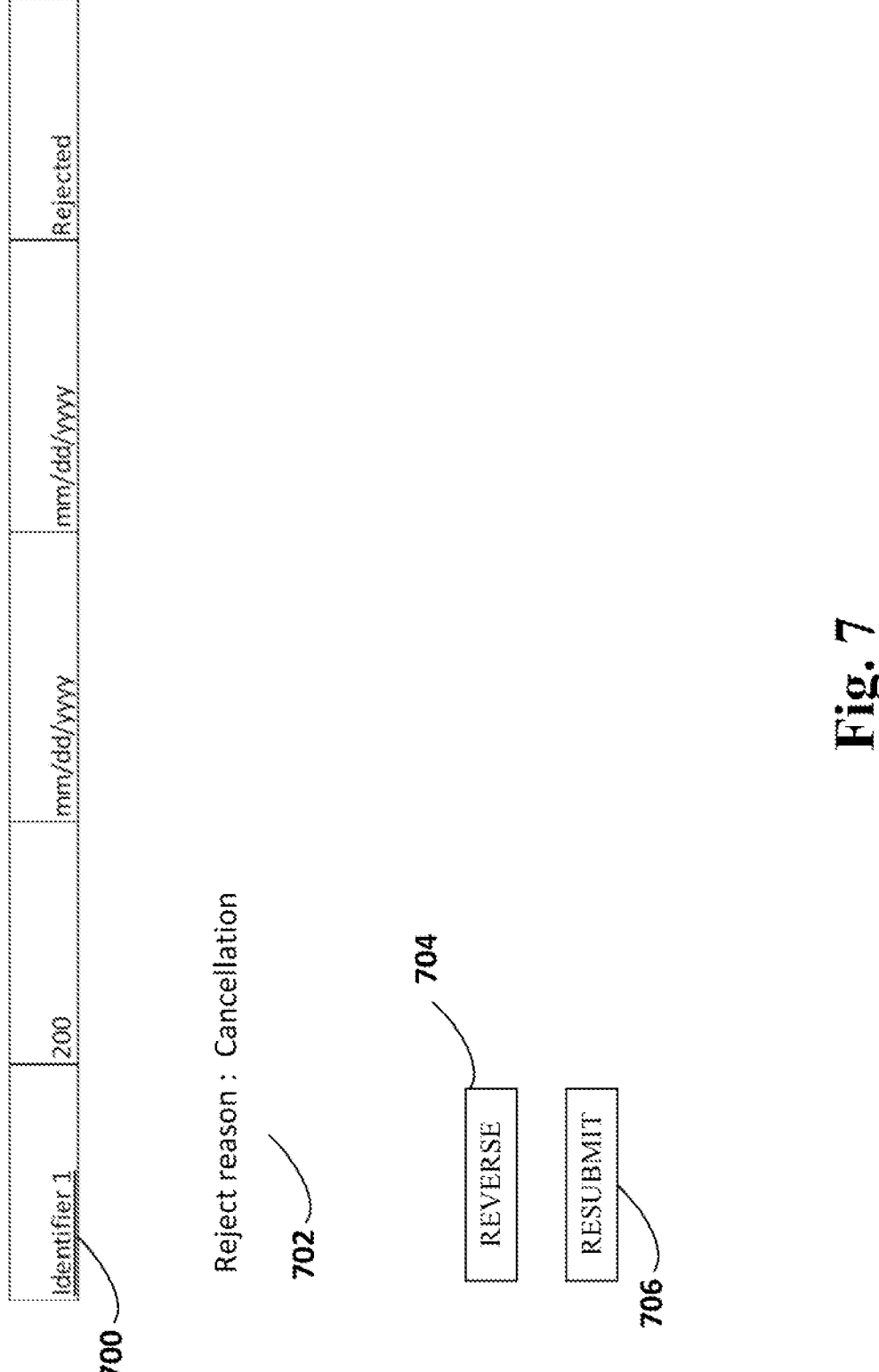
FIG. 7 is an example user interface displays in accordance certain example embodiments of the present disclosure.

An example resolution interface is provided in FIG. 7. Account details 700, such as but not limited to policy details, are displayed for reference, along with reject reason 702, if applicable. Examples of a reject reason may include cancellation, policy cancelled, invoice paid, and/or the like. Component 704 enables the user to direct a reversal toward the remittance entity, such as but not limited to initiating a reimbursement to a lender, for example. Component 706 enables editing and resubmission and may redirect the user to a user interface similar to that of FIG. 5B, by which modification to a pending transaction or payment may be made.

As shown by decision 634 in FIG. 6A, if selection of component 704 is made, at operation 636 the apparatus 150 embodied by centralized remittance server 110 includes means, such as memory 11, processor 12, communications interface 14 and/or the like, for causing transmission of instructions for reversing a transaction, which in certain examples such as those in which funds were remitted to the centralized remittance account, may be referred to as, or may include reimbursement. In certain embodiments reversing a transaction may include indicating returning a quantity or amount, or undoing of the transaction to another party, such as a remittance entity and/or remittance entity device. In this regard, the reversal may include a refund of funds. Operation 636 may further include cancelling the pending transaction (and/or associated payment, according to certain examples) with the multi-transactional server 211. In this regard, when the transaction is associated with a payment, any funds held in the centralized remittance account 252 may be refunded to the remittance account 252 from which they originated. A pending or rejected payment stored by the multi-transaction system 202B and/or centralized remittance system 100 may be updated to cancelled.

Accordingly, a carrier system 202A may reject an ACH payment with the corresponding financial system 202C. In certain embodiments, virtual credit card payment can be refunded fully or in part to the virtual credit card, and a new status can be provided to the centralized remittance system 100. According to certain embodiments, the centralized remittance server 110 may be configured to execute a refund request for ACH transactions, such as by sending debit requests to the financial system 202C using a same payment instruction method as the payment that was received. In any event, various methods and processes may be contemplated to facilitate cancellation of payments and/or refunds.

In operation 638, if a user initiated modification of certain payment details based in response to reviewing the rejected payment in the resolution interface, the apparatus 150 embodied by centralized remittance server 110 includes means, such as memory 11, processor 12, communications interface 14 and/or the like, for modifying a respective standardized transaction data object. As one non-limiting example, a user may redirect payment as a check instead of ACH or wire, for example. In certain embodiments, the user interface display may include policy data, loan data, and/or the like, accessed from repository 120, to assist in the reconciliation process. As such, as shown following operation 328 of FIG. 3A, if a standardized transaction data object is edited during a reconciliation and/or resolution activity, in certain embodiments, the edited object is reprocessed on a next cycle or interval and resubmitted toward the multi-transaction server 211 in a multi-transaction data file, repeating certain operations illustrated in FIG. 3A.

FIG. 8 is a flowchart of operations that may be performed by a centralized remittance server 100 and/or a centralized remittance server 110 according to certain example embodiments.

In operation 800, apparatus 150 embodied by centralized remittance system 100 and/or centralized remittance server 110 includes means, such as memory 11, processor 12, communications interface 14 and/or the like, for receiving a plurality of request data objects from at least one requesting device. See, for example operation 302 of FIG. 3A.

In operation 802, apparatus 150 embodied by centralized remittance system 100 and/or centralized remittance server 110 includes means, such as memory 11, processor 12, communications interface 14 and/or the like, for requesting a plurality of remittance data objects from a plurality of remittance entity devices based on the request data objects. See, for example, operation 306 of FIG. 3A.

In operation 804, apparatus 150 embodied by centralized remittance system 100 and/or centralized remittance server 110 includes means, such as memory 11, processor 12, communications interface 14 and/or the like, for generating standardized transaction data objects based on the request data objects. See, for example, operation 308 of FIG. 3A.

In operation 806, apparatus 150 embodied by centralized remittance system 100, centralized remittance server 110, and/or centralized remittance repository 120, includes means, such as memory 11, processor 12, and/or the like, for storing at least temporarily, the received plurality of request data objects, and/or corresponding standardized transaction data objects, as unprocessed request data objects. See, for example, operation 310 of FIG. 3A.

In operation 808, apparatus 150 embodied by centralized remittance system 100 and/or centralized remittance server 110 includes means, such as memory 11, processor 12 and/or the like, for generating a multi-transaction data file comprising the standardized transaction data objects. See for example, operation 312 of FIG. 3A.

In operation 810, apparatus 150 embodied by centralized remittance system 100 and/or centralized remittance server 110 includes means, such as memory 11, processor 12, communications interface 14 and/or the like, for causing transmission of the multi-transaction data file toward a multi-transaction server interfacing with the apparatus, such as the centralized remittance system 100 and/or centralized remittance server 110, to cause remittance instructions to be transmitted to respective client devices, such as financial system 202D and/or server 231. In certain embodiments, causing transmission of the multi-transaction data file toward a multi-transaction server interfacing with the apparatus, such as the centralized remittance system 100 and/or centralized remittance server 110, further causes remittance of funds, such as from a centralized remittance account 252 to a recipient account, such as recipient account 250 associated with respective requesting devices of the at least one requesting devices. For example, see operations 312 and 326 of FIG. 3A.

Figure 9A:
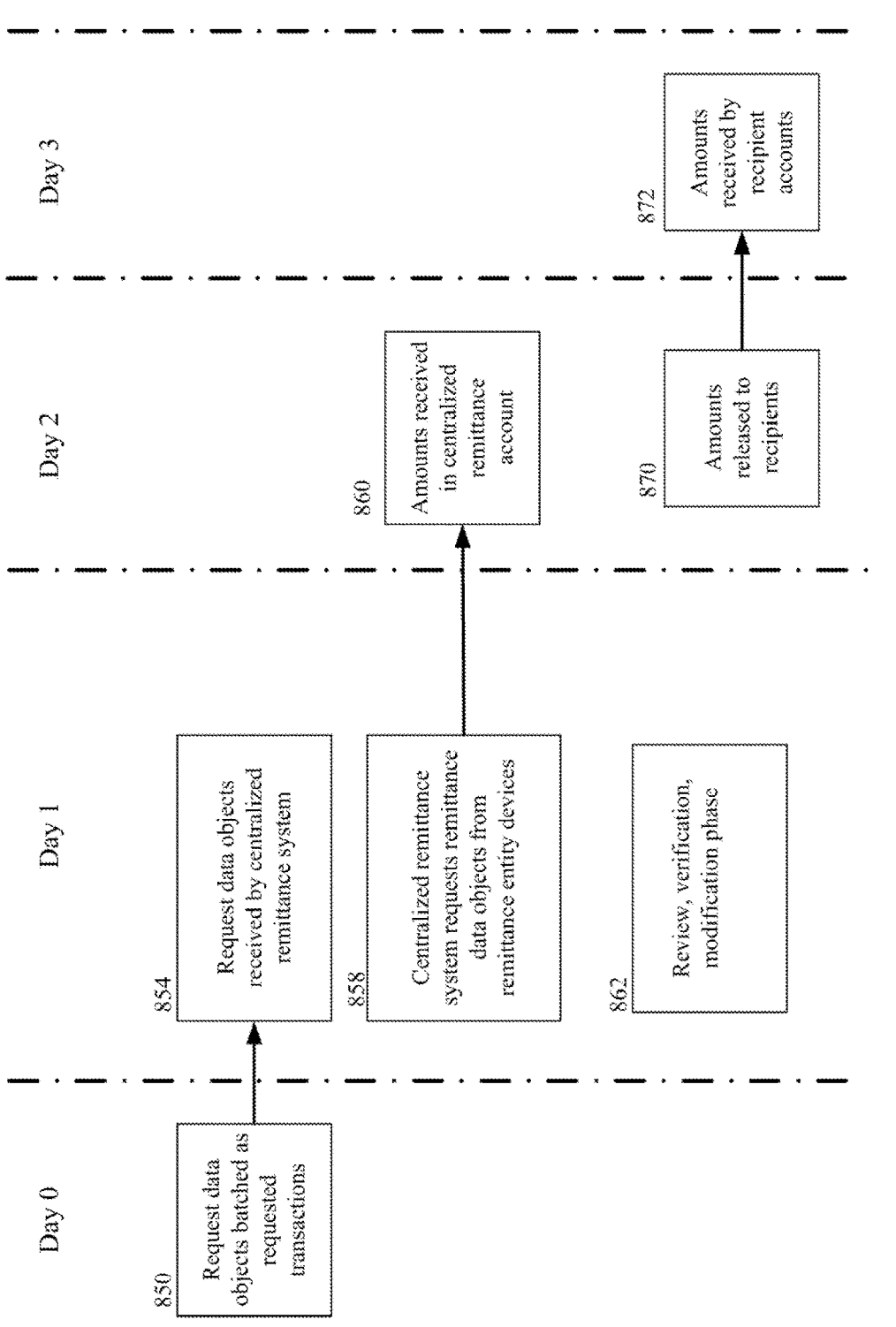
FIGS. 9A and 9B are example timing diagrams in accordance certain example embodiments of the present disclosure.

FIG. 9A is an example timing diagram of certain operations performed according to certain example embodiments. The timeframe of Days 0-3 described with respect to FIG. 9A is provided merely as an example, and variations in the timing may be contemplated. In operation 850, on Day 0, for example, the request data objects are batched, representing requested transaction. In operation 854, on Day 1, request data objects are received by the centralized remittance system. In operation 858, which may also occur on Day 1, the centralized remittance system requests remittance data objects from remittance entity devices. Meanwhile, in operation 862, review, verification and modification may be performed such as described with respect to operations 314, 328, 636, 634, 638, and/or the like. On Day 2, in operation 860, amounts are received in the centralized remittance account, and in operation 870, released to recipients. On Day 3, in operation 872, for example, the amounts are received by recipient accounts.

Figure 9B:
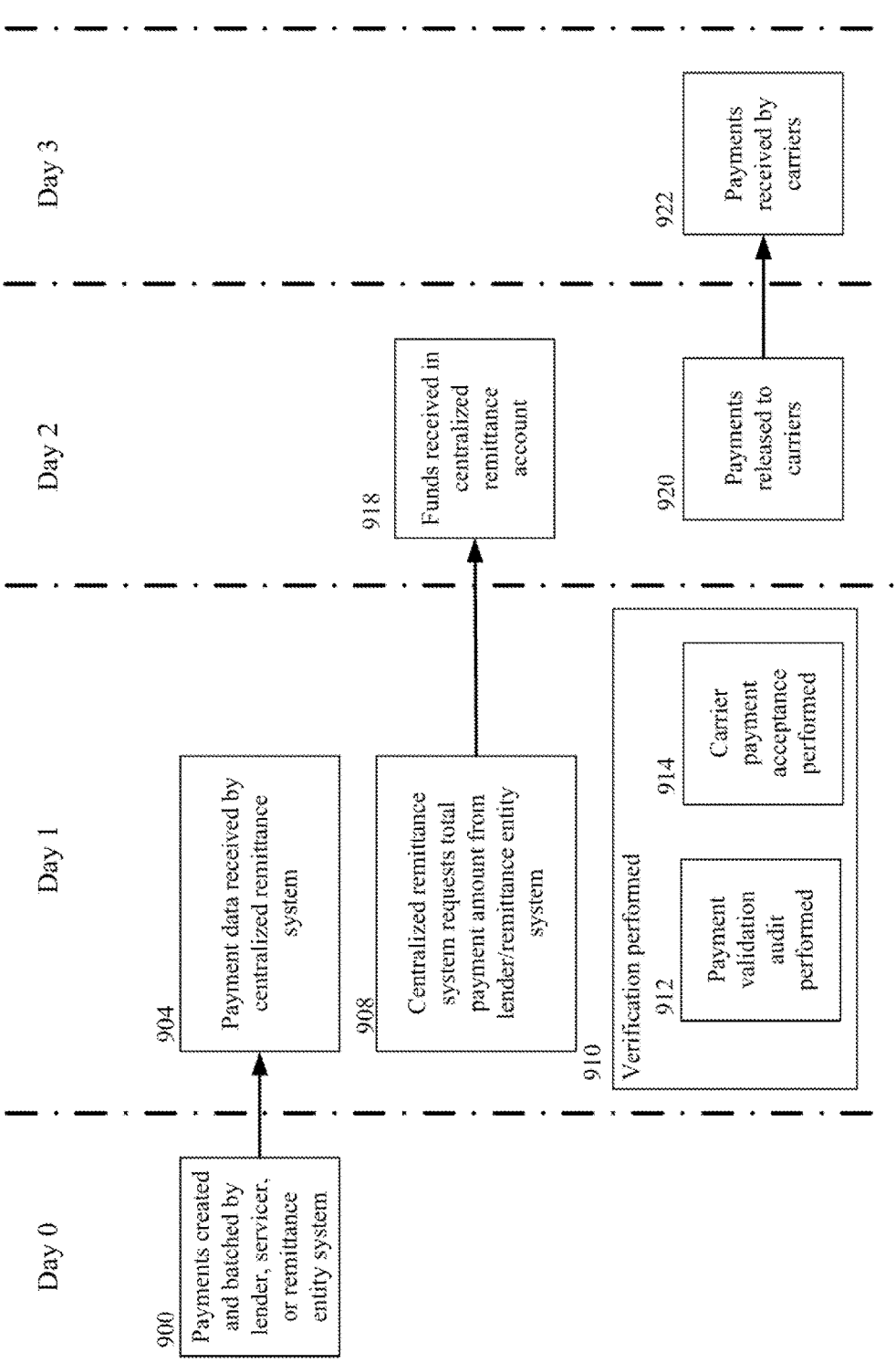

FIG. 9B is an example timing diagram of certain operations performed according to certain example embodiments. The timeframe of Days 0-3 described with respect to FIG. 9B is provided merely as an example, and variations in the timing may be contemplated. However, certain advantages of the exemplary timing sequence are described below. In operation 900, occurring on Day 0, for example, the remittance entity system 202E, such as associated with a lender, servicer, and/or the like, creates and batches payment data based on carrier invoices and/or the like. In certain embodiments, the financial system 202F batches a routine, (e.g., nightly) cycle to approve payments requested by the remittance entity system 202E. In operation 904, occurring on Day 1, for example, the payment data is received by the centralized remittance system 100. In operation 908, on Day 1, for example, the centralized remittance system 100 requests a total payment amount from the lender. Meanwhile, such as also occurring on Day 1, in operation 910, verification and modification activity is enabled, including payment validation audit 912 and carrier payment acceptance 914. Payment could be declined, cancelled and/or not accepted for a variety of reasons, such as but not limited to a loan in payoff, foreclosure, escrow limited exceeded, and/or the like. In this regard, payments can be correct and/or cancelled prior to transfer to the carrier that begins on Day 2. On Day 2, as shown by operation 918, the funds may be received in the centralized remittance account, and later at 920, released to carriers, and received at 922 on Day 3.

Example embodiments provided herein provide efficient management of the information tied to payment remittance and facilitating the routing of funds and related information from one third party to another, for example from a lender to an insurance carrier for the payment of insurance premiums from escrow. Payments initiated by a lender for a policy that is no longer up to date or in place may be reduce and/or cancelled prior to funds being remitted to a carrier, further reducing the number of cancelations occurring after funds are remitted to the carrier and reducing the number of transactions needed to refund the payment to the lender. This reduction in refunds further reduces the recordkeeping expended by processing and memory resources, and associated network consumption to communicate such cancellation throughout the various third party systems discussed herein.

Example embodiments therefore provide technical improvements to existing remittance systems, such as but not limited to centralized remittance systems, and related third party systems, such as but not limited to financial systems configured to receive and transmit payments on behalf of the respective third parties, remittance entity systems that provide instructions for payment remittance and associated recording keeping, and/or the like.

Centralized remittance systems as described herein according to example embodiments, further improve upon systems that facilitate one-to-one and/or one-in-one invoice to payment configurations where an electronic or other payment is remitted for each invoice generated. According to embodiments provided herein, the number of requests for funds and separate fund transfers are reduced, as directed by the multi-transaction data file.

It will be appreciated that certain example embodiments are described herein with reference to payments from lender escrow accounts for the payment of insurance premiums to carriers, but numerous other applications and implementations of example embodiments may be contemplated. For example, the functionality of the centralized remittance system may be utilized in any industry or domain in which payments from one payer are remitted toward various recipients, such as but not limited to vehicle protection plans, device protection plans, and/or the like. Still further, the functionality provided by the centralized remittance system 100 may be exposed to numerous third party systems for their own configuration via an API, enabling custom fields to be created in the request data objects, standardized transaction data objects, and/or the data objects described herein according to example embodiments. Accordingly, the example use cases described herein are not considered limiting, and various implementations and customizations may indeed be contemplated.

CONCLUSION

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. An apparatus comprising at least one processor and at least one non-transitory memory including computer program code, the at least one non-transitory memory and the computer program code configured to, with the at least one processor, cause the apparatus to at least:

receive a plurality of request data objects from at least one requesting device;

request a plurality of remittance data objects from a plurality of remittance entity devices based on the plurality of request data objects, wherein the remittance data objects comprise remittance instructions;

generate standardized transaction data objects based on the plurality of request data objects, wherein the standardized transaction data objects are in predefined format;

store until a predetermined time, a status of each of the plurality of request data objects as unprocessed;

facilitate review of the plurality of request data objects having the status as unprocessed, until the predetermined time, via a graphical user interface, wherein the graphical user interface enables user-directed modification of the plurality of request data objects having the status as unprocessed;

upon or after the predetermined time:

generate a multi-transaction data file comprising the standardized transaction data objects; and transition the status of the plurality of request data objects from unprocessed to scheduled; and cause transmission of the multi-transaction data file toward a multi-transaction server interfacing with the apparatus to cause the remittance instructions to be transmitted to respective client devices.

2. The apparatus according to claim 1, wherein causing transmission of the multi-transaction data file toward a multi-transaction server interfacing with the apparatus further causes remittance of funds to a recipient account associated with respective requesting devices of the at least one requesting device.

3. The apparatus according to claim 1, wherein the at least one non-transitory memory and the computer program code are further configured to, with the at least one processor, cause the apparatus to at least:

receive response data from the multi-transaction server, the response data comprising one or more rejected responses;

queue the one or more rejected responses from the multi-transaction server into a resolution queue; and transmit computer program instructions configured to facilitate at least one of initiation of reimbursement of a rejected transaction toward a respective remittance entity device or a resubmission toward the multi-transaction server.

4. The apparatus according to claim 1, wherein the at least one non-transitory memory and the computer program code are further configured to, with the at least one processor, cause the apparatus to at least:

receive response data from the multi-transaction server, the response data generated from user input provided via the respective requesting device; and based on the response data, transmit computer program instructions configured to facilitate at least one of initiation of reimbursement toward a respective remittance entity device or a resubmission toward the multi-transaction server.

5. The apparatus according to claim 4, wherein the response data comprises a plurality of response data objects associated with respective request data objects, the user input indicates at least one rejection associated with at least one respective request data object.

6. The apparatus according to claim 1, wherein the multi-transaction data file is transmitted toward the multi-transaction server as a batch file.

7. A method comprising:

receiving a plurality of request data objects from at least one requesting device;

requesting a plurality of remittance data objects from a plurality of remittance entity devices based on the request data objects;

generating standardized transaction data objects based on the plurality of request data objects, wherein the remittance data objects comprise remittance instructions;

store until a predetermined time, a status of each of the plurality of request data objects as unprocessed;

facilitate review of the plurality of request data objects having the status as unprocessed, until the predetermined time, via a graphical user interface, wherein the graphical user interface enables user-directed modification of the plurality of request data objects having the status as unprocessed;

upon or after the predetermined time:

generating a multi-transaction data file comprising the standardized transaction data objects; and causing transmission of the multi-transaction data file toward a multi-transaction server to cause the remittance instructions to be transmitted to respective client devices.

8. The method according to claim 7, wherein causing transmission of the multi-transaction data file toward a multi-transaction server further causes remittance of funds to a recipient account associated with respective requesting devices of the at least one requesting device.

9. The method according to claim 7, further comprising:

receiving response data from the multi-transaction server, the response data comprising one or more rejected responses;

queueing the one or more rejected responses from the multi-transaction server into a resolution queue; and transmitting computer program instructions configured to facilitate at least one of initiation of reimbursement of a rejected transaction toward a respective remittance entity device or a resubmission toward the multi-transaction server.

10. The method according to claim 7, further comprising:

receiving response data from the multi-transaction server, the response data generated from user input provided via the respective requesting device; and based on the response data, transmitting computer program instructions configured to facilitate at least one of initiation of reimbursement toward a respective remittance entity device or a resubmission toward the multi-transaction server.

11. The method according to claim 10, wherein the response data comprises a plurality of response data objects associated with respective request data objects, the user input indicates at least one rejection associated with at least one respective request data object.

12. The method according to claim 7, wherein the multi-transaction data file is transmitted toward the multi-transaction server as a batch file.

13. The method according to claim 12, wherein prior to transmission of remittance instructions being transmitted to respective client devices, the multi-transaction server stores the standardized transaction data objects at least temporarily and facilitates review via the respective requesting device.

14. A computer program product comprising at least one non-transitory computer-readable storage medium having computer-executable program code instructions stored therein, the computer-executable program code instructions comprising program code instructions to:

receive a plurality of request data objects from at least one requesting device;

request a plurality of remittance data objects from a plurality of remittance entity devices based on the plurality of request data objects, wherein the remittance data objects comprise remittance instructions;

generate standardized transaction data objects based on the plurality of request data objects, wherein the remittance data objects comprise remittance instructions;

store until a predetermined time, a status of each of the plurality of request data objects as unprocessed;

facilitate review of the plurality of request data objects having the status as unprocessed, until the predetermined time, via a graphical user interface, wherein the graphical user interface enables user-directed modification of the plurality of request data objects having the status as unprocessed;

upon or after the predetermined time:

generate a multi-transaction data file comprising the standardized transaction data objects; and transition the status of the plurality of request data objects from unprocessed to scheduled; and cause transmission of the multi-transaction data file toward a multi-transaction server interfacing with the computer program product to cause the remittance instructions to be transmitted to respective client devices.

15. The computer program product according to claim 14, wherein causing transmission of the multi-transaction data file toward a multi-transaction server interfacing with the computer program product further causes remittance of funds to a recipient account associated with respective requesting devices of the at least one requesting device.

16. The computer program product according to claim 14, wherein the computer-executable program code instructions further comprise program code instructions to:

receive response data from the multi-transaction server, the response data comprising one or more rejected responses;

queue the one or more rejected responses from the multi-transaction server into a resolution queue; and transmit computer program instructions configured to facilitate at least one of initiation of reimbursement of a rejected transaction toward a respective remittance entity device or a resubmission toward the multi-transaction server.

17. The computer program product according to claim 14, wherein the computer-executable program code instructions further comprise program code instructions to:

receive response data from the multi-transaction server, the response data generated from user input provided via the respective requesting device; and based on the response data, transmit computer program instructions configured to facilitate at least one of initiation of reimbursement toward a respective remittance entity device or a resubmission toward the multi-transaction server.

18. The computer program product according to claim 17, wherein the response data comprises a plurality of response data objects associated with respective request data objects, the user input indicates at least one rejection associated with at least one respective request data object.

19. The computer program product according to claim 14, wherein the multi-transaction data file is transmitted toward the multi-transaction server as a batch file.

* * * * *